US012635000B2

(12) United States Patent (10) Patent No.: US 12,635,000 B2

Patchava et al. (45) Date of Patent: May 19, 2026

(54) SPATIAL DOMAIN RANDOM ACCESS COMMUNICATION HANDLING

(71) Applicant: QUALCOMM Incorporated, San Diego, CA (US)

(72) Inventors: Raviteja Patchava, San Diego, CA (US); Jing Sun, San Diego, CA (US); Xiaoxia Zhang, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/453,771

(22) Filed: Aug. 22, 2023

(65) Prior Publication Data

US 2025/0071815 A1     Feb. 27, 2025

(51) Int. Cl.
H04W 74/0833     (2024.01)
H04B 17/318     (2015.01)
H04W 16/28     (2009.01)

(52) U.S. Cl.
CPC ...... H04W 74/0833 (2013.01); H04B 17/328 (2023.05); H04W 16/28 (2013.01)

(58) Field of Classification Search
CPC . H04B 17/328; H04W 16/28; H04W 74/0833
See application file for complete search history.

(56) References Cited

U.S. PATENT DOCUMENTS

| | | | | | |
|---|---|---|---|---|---|
| 11,943,816 | B2 * | 3/2024 | Dallal | .................. | H04W 56/001 |
| 12,004,237 | B2 * | 6/2024 | Cozzo | .................. | H04B 7/0695 |
| 12,156,191 | B2 * | 11/2024 | Xiong | .................... | H04L 1/1864 |
| 12,238,777 | B2 * | 2/2025 | Hwang | .................. | H04L 5/0057 |
| 2010/0002630 | A1 * | 1/2010 | Park | ...................... | H04L 1/1812 |
| | | | | | 370/328 |
| 2019/0268961 | A1 * | 8/2019 | Tsai | ....................... | H04W 16/28 |
| 2019/0350002 | A1 * | 11/2019 | Chen | ....................... | H04W 8/26 |
| 2020/0373969 | A1 * | 11/2020 | Tsai | .................. | H04W 74/0833 |

(Continued)

FOREIGN PATENT DOCUMENTS

| | | | | | | |
|---|---|---|---|---|---|---|
| CN | | 116114362 | A * | 5/2023 | ........ | H04W 74/0833 |
| CN | | 116368930 | A * | 6/2023 | ........ | H04W 74/0833 |
| CN | | 118633329 | A * | 9/2024 | .......... | H04W 52/146 |
| CN | | 119732161 | A * | 3/2025 | .......... | H04W 74/004 |
| EP | | 4294105 | A1 * | 12/2023 | ........ | H04W 74/0833 |
| EP | | 4546727 | A1 * | 4/2025 | .......... | H04W 64/003 |

(Continued)

*Primary Examiner* — Eric Nowlin

(74) *Attorney, Agent, or Firm* — Paul M. McAdams; Harrity & Harrity, LLP

(57) ABSTRACT

Various aspects of the present disclosure generally relate to wireless communication. In some aspects, a first network entity may transmit, to a second network entity, a first random access communication including a random access preamble. The first network entity may receive, from the second network entity, a second random access communication including an identifier indicative of the random access preamble, and a first resource allocation. The first network entity may receive, from the second network entity, a third random access communication including the identifier, and indicating a second resource allocation. The first network entity may transmit, to the second network entity, a fourth random access communication via a particular resource allocation, wherein the particular resource is either the first resource allocation or the second resource allocation. Numerous other aspects are described.

17 Claims, 14 Drawing Sheets

100 ➔

(56) References Cited

U.S. PATENT DOCUMENTS

| | | | | |
|---|---|---|---|---|
| 2022/0095372 A1* | 3/2022 | Cozzo | ................. | H04B 7/0695 |
| 2022/0117002 A1* | 4/2022 | Dallal | ............... | H04W 74/0841 |
| 2023/0164000 A1* | 5/2023 | Hessler | ................ | H04L 5/0048 |
| | | | | 370/329 |
| 2023/0171814 A1* | 6/2023 | Cozzo | ............... | H04W 74/0866 |
| | | | | 370/329 |
| 2023/0247444 A1* | 8/2023 | Cozzo | ................. | H04W 16/28 |
| | | | | 370/329 |
| 2023/0254075 A1* | 8/2023 | Cozzo | ............... | H04W 72/0446 |
| 2023/0403746 A1* | 12/2023 | Yang | ................. | H04B 7/06952 |
| 2024/0032107 A1* | 1/2024 | Cozzo | ............... | H04W 74/0891 |
| 2024/0215078 A1* | 6/2024 | Silva | ................ | H04W 74/0841 |
| 2024/0389154 A1* | 11/2024 | Menon | ............. | H04W 74/0833 |
| 2025/0007654 A1* | 1/2025 | Li | ....................... | H04W 74/004 |
| 2025/0048370 A1* | 2/2025 | Wu | ................. | H04W 74/0833 |

FOREIGN PATENT DOCUMENTS

| | | | | | |
|---|---|---|---|---|---|
| EP | 4572507 A1 | * | 6/2025 | ............ | H04W 48/16 |
| KR | 20240121260 A | * | 8/2024 | ........ | H04W 74/0833 |
| KR | 20240132489 A | * | 9/2024 | .......... | H04W 52/146 |
| KR | 20240144397 A | * | 10/2024 | .............. | H04L 5/14 |
| KR | 20250036902 A | * | 3/2025 | .......... | H04W 74/004 |
| KR | 20250044869 A | * | 4/2025 | ............ | H04W 48/16 |
| WO | WO-2022060115 A1 | * | 3/2022 | ............ | H04W 72/23 |
| WO | WO-2022081341 A1 | * | 4/2022 | ........ | H04W 74/0833 |
| WO | WO-2023101367 A1 | * | 6/2023 | ............ | H04W 16/28 |
| WO | WO-2023146381 A1 | * | 8/2023 | .......... | H04W 52/146 |
| WO | WO-2023153825 A1 | * | 8/2023 | .............. | H04L 5/14 |
| WO | WO-2024009198 A1 | * | 1/2024 | ........ | H04B 7/06952 |
| WO | WO-2024014922 A1 | * | 1/2024 | .......... | H04W 74/004 |
| WO | WO-2024034922 A1 | * | 2/2024 | ............ | H04W 48/16 |

* cited by examiner

100

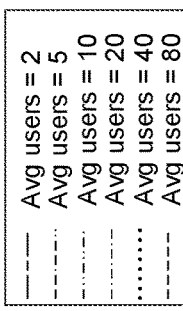
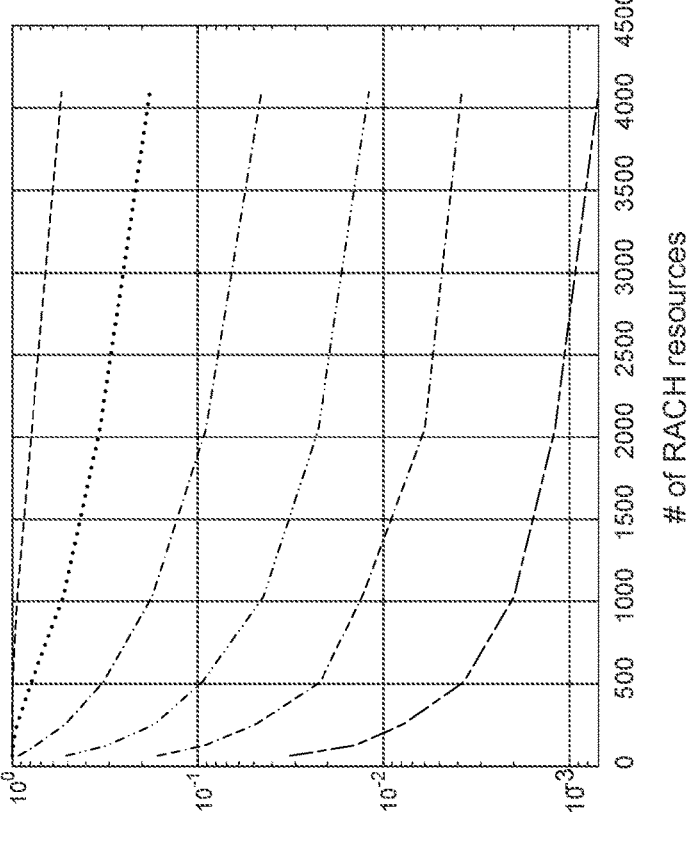
FIG. 8
800

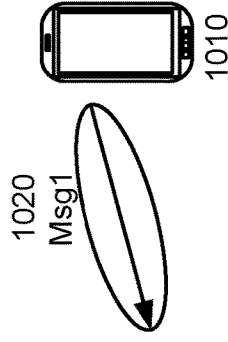
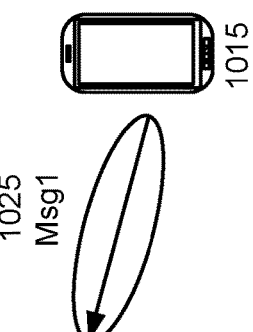
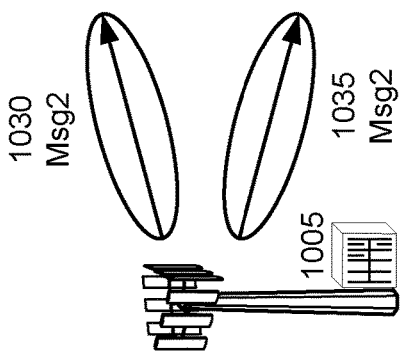
1010
1015
1020
Msg1
1025
Msg1
1030
Msg2
1035
Msg2
1005
1000
FIG. 10

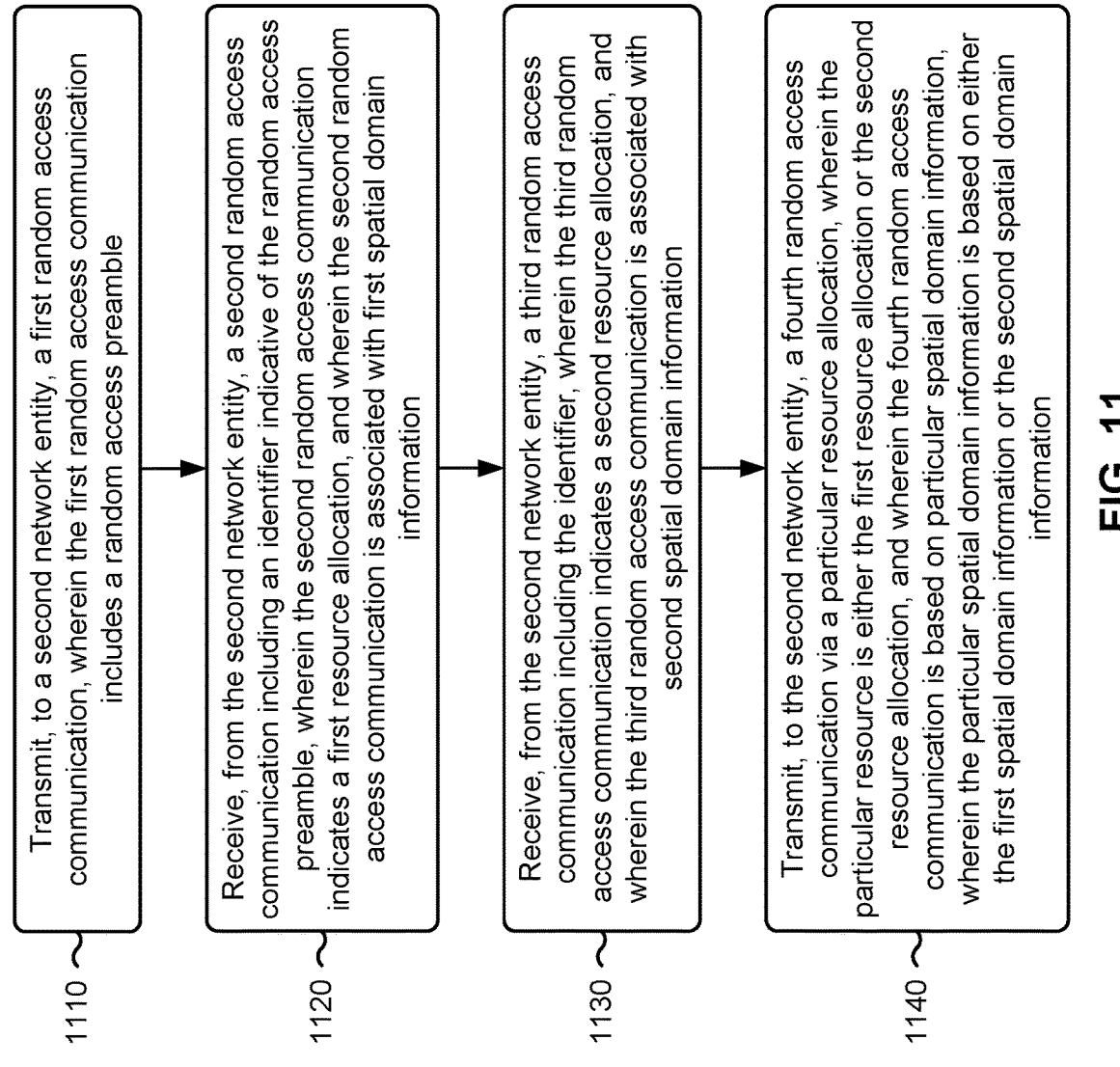

1110 Transmit, to a second network entity, a first random access communication, wherein the first random access communication includes a random access preamble 1120 Receive, from the second network entity, a second random access communication including an identifier indicative of the random access preamble, wherein the second random access communication indicates a first resource allocation, and wherein the second random access communication is associated with first spatial domain information 1130 Receive, from the second network entity, a third random access communication including the identifier, wherein the third random access communication indicates a second resource allocation, and wherein the third random access communication is associated with second spatial domain information 1140 Transmit, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information

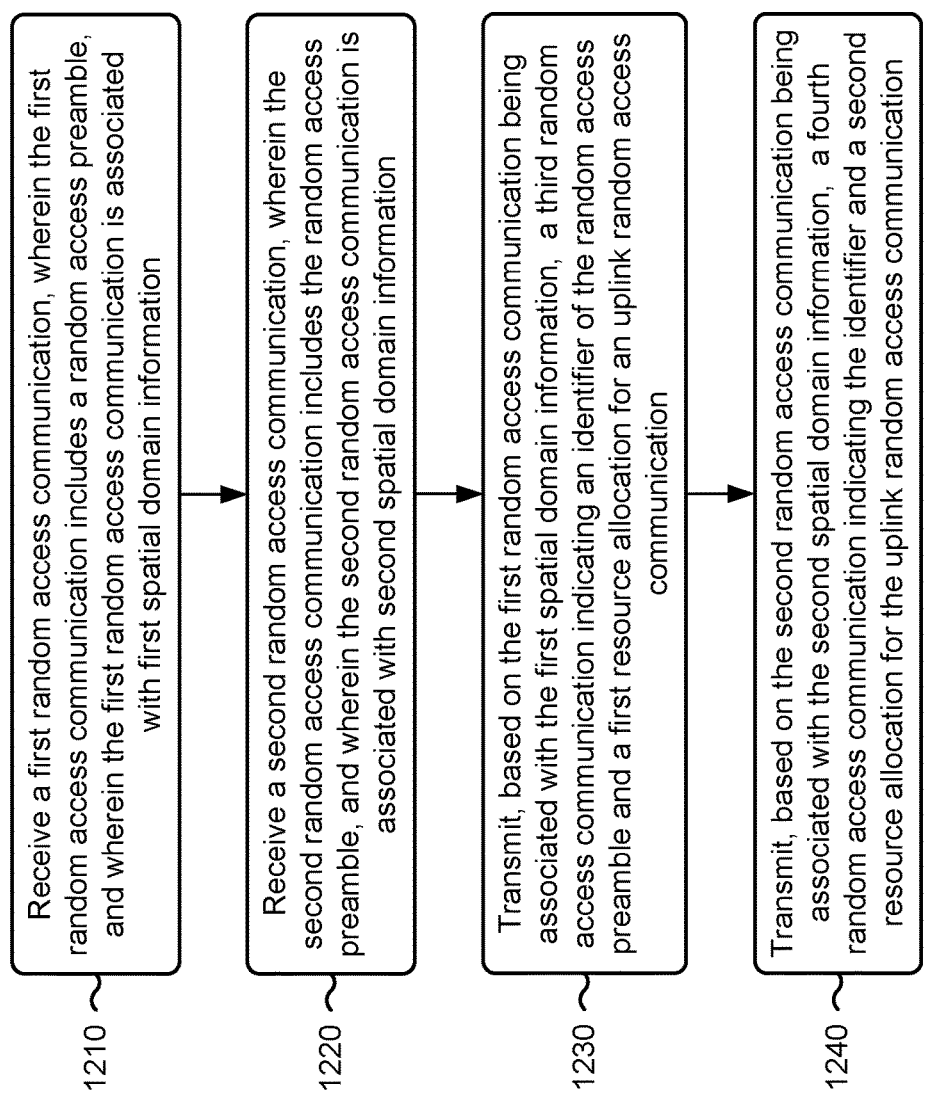

1210   Receive a first random access communication, wherein the first random access communication includes a random access preamble, and wherein the first random access communication is associated with first spatial domain information 1220   Receive a second random access communication, wherein the second random access communication includes the random access preamble, and wherein the second random access communication is associated with second spatial domain information 1230   Transmit, based on the first random access communication being associated with the first spatial domain information, a third random access communication indicating an identifier of the random access preamble and a first resource allocation for an uplink random access communication 1240   Transmit, based on the second random access communication being associated with the second spatial domain information, a fourth random access communication indicating the identifier and a second resource allocation for the uplink random access communication

SPATIAL DOMAIN RANDOM ACCESS COMMUNICATION HANDLING

FIELD OF THE DISCLOSURE

Aspects of the present disclosure generally relate to wireless communication and to techniques and apparatuses for spatial domain random access communication handling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a first network entity for wireless communication includes a processing system. The processing system may be configured to transmit, to a second network entity, a first random access communication, wherein the first random access communication includes a random access preamble. The processing system may be configured to receive, from the second network entity, a second random access communication including an identifier indicative of the random access preamble, wherein the second random access communication indicates a first resource allocation, and wherein the second random access communication is associated with first spatial domain information. The processing system may be configured to receive, from the second network entity, a third random access communication including the identifier, wherein the third random access communication indicates a second resource allocation, and wherein the third random access communication is associated with second spatial domain information. The processing system may be configured to transmit, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information.

In some aspects, a first network entity for wireless communication includes a processing system. The processing system may be configured to receive a first random access communication, wherein the first random access communication includes a random access preamble, and wherein the first random access communication is associated with first spatial domain information. The processing system may be configured to receive a second random access communication, wherein the second random access communication includes the random access preamble, and wherein the second random access communication is associated with second spatial domain information. The processing system may be configured to transmit, based on the first random access communication being associated with the first spatial domain information, a third random access communication indicating an identifier of the random access preamble and a first resource allocation for an uplink random access communication. The processing system may be configured to transmit, based on the second random access communication being associated with the second spatial domain information, a fourth random access communication indicating the identifier and a second resource allocation for the uplink random access communication.

In some aspects, a method of wireless communication may be performed by a first network entity. The method may include transmitting, to a second network entity, a first random access communication, wherein the first random access communication includes a random access preamble. The method may include receiving, from the second network entity, a second random access communication including an identifier indicative of the random access preamble, wherein the second random access communication indicates a first resource allocation, and wherein the second random access communication is associated with first spatial domain information. The method may include receiving, from the second network entity, a third random access communication including the identifier, wherein the third random access communication indicates a second resource allocation, and wherein the third random access communication is associated with second spatial domain information. The method may include transmitting, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information.

In some aspects, a method of wireless communication performed by a first network entity. The method may include receiving a first random access communication, wherein the first random access communication includes a random access preamble, and wherein the first random access communication is associated with first spatial domain information. The method may include receiving a second random access communication, wherein the second random access communication includes the random access preamble, and wherein the second random access communication is associated with second spatial domain information. The method may include transmitting, based on the first random access communication being associated with the first spatial domain information, a third random access communication indicating an identifier of the random access preamble and a first resource allocation for an uplink random access communication. The method may include transmitting, based on the second random access communication being associated with the second spatial domain information, a fourth random access communication indicating the identifier and a second resource allocation for the uplink random access communication.

In some aspects, a non-transitory computer-readable medium may have a set of instructions stored thereon for wireless communication. The set of instructions, when executed by an apparatus, may cause the apparatus to transmit, to a network entity, a first random access communication, wherein the first random access communication includes a random access preamble. The set of instructions, when executed by the apparatus, may cause the apparatus to receive, from the network entity, a second random access communication including an identifier indicative of the random access preamble, wherein the second random access communication indicates a first resource allocation, and wherein the second random access communication is associated with first spatial domain information. The set of instructions, when executed by the apparatus, may cause the apparatus to receive, from the network entity, a third random access communication including the identifier, wherein the third random access communication indicates a second resource allocation, and wherein the third random access communication is associated with second spatial domain information. The set of instructions, when executed by the apparatus, may cause the apparatus to transmit, to the network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information.

In some aspects, a non-transitory computer-readable medium may have a set of instructions stored thereon for wireless communication. The set of instructions, when executed by an apparatus, may cause the apparatus to receive a first random access communication, wherein the first random access communication includes a random access preamble, and wherein the first random access communication is associated with first spatial domain information. The set of instructions, when executed by the apparatus, causes the apparatus to receive a second random access communication, wherein the second random access communication includes the random access preamble, and wherein the second random access communication is associated with second spatial domain information. The set of instructions, when executed by the apparatus, causes the apparatus to transmit, based on the first random access communication being associated with the first spatial domain information, a third random access communication indicating an identifier of the random access preamble and a first resource allocation for an uplink random access communication. The set of instructions, when executed by the apparatus, causes the apparatus to transmit, based on the second random access communication being associated with the second spatial domain information, a fourth random access communication indicating the identifier and a second resource allocation for the uplink random access communication.

In some aspects, an apparatus for wireless communication may include means for transmitting, to a second network entity, a first random access communication, wherein the first random access communication includes a random access preamble. The apparatus may include means for receiving, from the second network entity, a second random access communication including an identifier indicative of the random access preamble, wherein the second random access communication indicates a first resource allocation, and wherein the second random access communication is associated with first spatial domain information. The apparatus may include means for receiving, from the second network entity, a third random access communication including the identifier, wherein the third random access communication indicates a second resource allocation, and wherein the third random access communication is associated with second spatial domain information. The apparatus may include means for transmitting, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information.

In some aspects, an apparatus for wireless communication may include means for receiving a first random access communication, wherein the first random access communication includes a random access preamble, and wherein the first random access communication is associated with first spatial domain information. The apparatus may include means for receiving a second random access communication, wherein the second random access communication includes the random access preamble, and wherein the second random access communication is associated with second spatial domain information. The apparatus may include means for transmitting, based on the first random access communication being associated with the first spatial domain information, a third random access communication indicating an identifier of the random access preamble and a first resource allocation for an uplink random access communication. The apparatus may include means for transmitting, based on the second random access communication being associated with the second spatial domain information, a fourth random access communication indicating the identifier and a second resource allocation for the uplink random access communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing broadly outlines example features and example technical advantages of examples according to the disclosure. Additional example features and example advantages are described hereinafter.

BRIEF DESCRIPTION OF THE DRAWINGS

The appended drawings illustrate certain example aspects of this disclosure and are therefore not limiting in scope. The same reference numbers in different drawings may identify the same or similar elements.

FIG. 8 is a diagram illustrating an example of collision probabilities for a random access procedure, in accordance with the present disclosure.

FIG. 10 is a diagram of an example associated with spatial domain random access communication handling, in accordance with the present disclosure.

FIG. 11 is a diagram illustrating an example process performed, for example, at a first network entity or an apparatus of a first network entity, in accordance with the present disclosure.

FIG. 12 is a diagram illustrating an example process performed, for example, at a first network entity or an apparatus of a first network entity, in accordance with the present disclosure.

DETAILED DESCRIPTION

Figure 1:
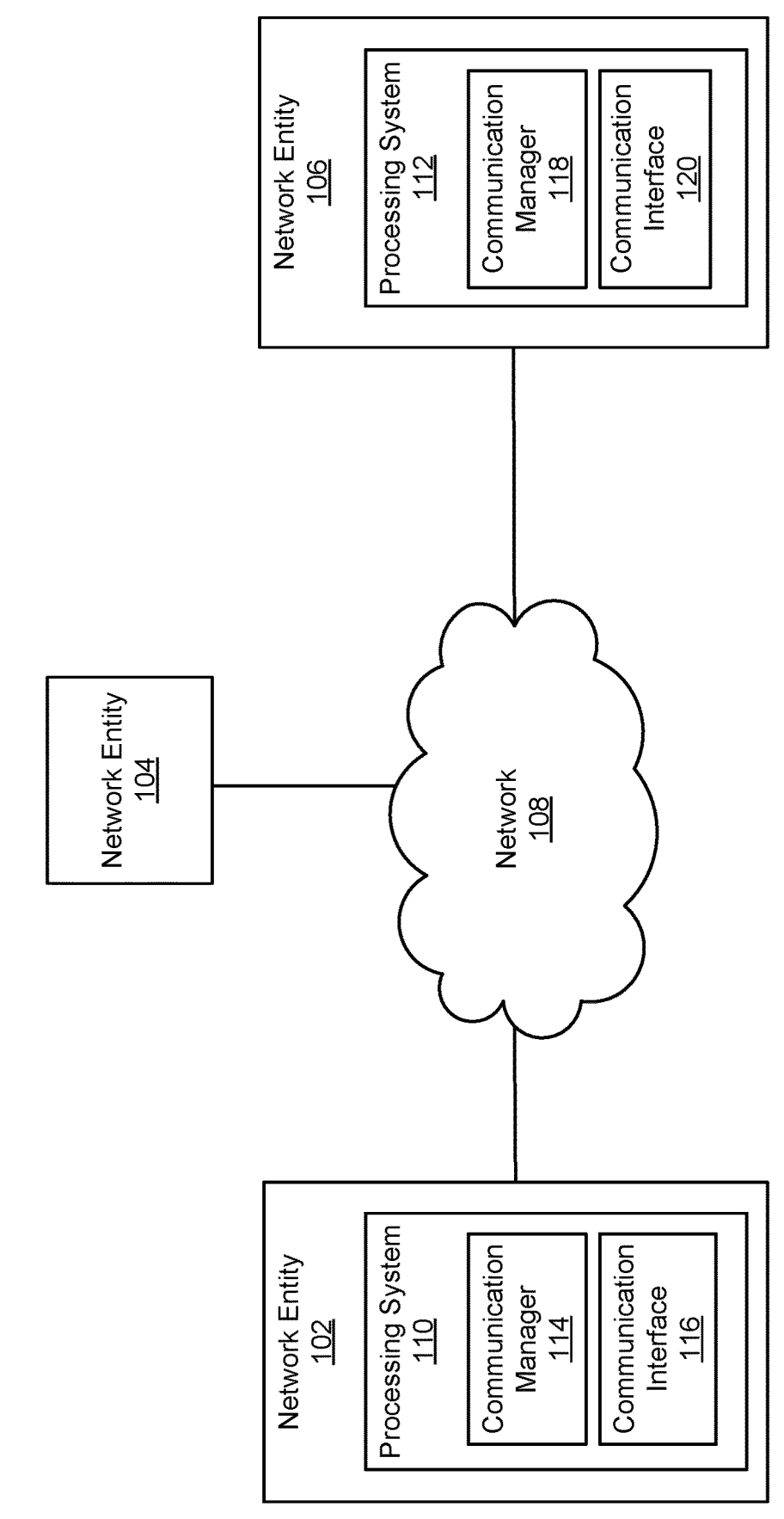
FIG. 1 is a diagram illustrating an example environment in which apparatuses and/or methods described herein may be implemented, in accordance with the present disclosure.

In some examples, two or more user equipments (UEs) may transmit random access messages (e.g., msg1 communications) to a network entity using the same preamble (e.g., the same physical random access channel (PRACH) preamble) and the same random access channel (RACH) occasion (e.g., using the same time domain and/or frequency domain resources to transmit the RAM). A scenario in which two or more UEs transmit a RAM using the same preamble and the same RACH occasion may be referred to as a RACH collision, a PRACH collision, a preamble collision, a sequence (e.g., a preamble sequence) collision, and/or a sequence domain collision, among other examples. In such examples, the network entity may be unable to distinguish between the two or more UEs. As a result, the network entity may (e.g., in response to receiving multiple RAMs with the same preamble and via the same RACH occasion) consider a single UE to be detected. The network entity may transmit a single random access response (RAR) (e.g., in response to the multiple RAMs). Each UE (from the two or more UEs) may determine that a resource allocation indicated by the single RAR is granted for that UE. For example, each UE will treat an RAR uplink grant (e.g., indicated in a msg2) as allocated to itself (because the RAR uplink grant will use the preamble transmitted by each UE as a temporary ID to distinguish UEs). Each UE (from the two or more UEs) may transmit a msg3 using the resource allocation indicated by the single RAR (e.g., each UE may use the same RAR uplink grant to transmit a msg3).

As a result, the network entity may perform one or more contention resolution operations to distinguish the two or more UEs that transmit respective msg3 communications using the same RAR uplink grant. This may consume processing resources, memory resources, and/or power resources associated with performing the contention resolution. In some cases, because the two or more UEs transmit respective msg3 communications using the same RAR uplink grant, the network entity may fail to receive one or more of the msg3 communications (e.g., due to interference or other factors). As a result, UE(s) that transmit the failed msg3 communications may be unable to establish a connection with the network entity, resulting in the UE(s) re-initiating the RACH procedure (e.g., thereby increasing latency associated with establishing a network connection and consuming network resources, processing resources, memory resources, and/or power resources associated with performing another RACH procedure).

Various aspects relate generally to wireless communication and more particularly to random access procedures. Some aspects more specifically relate to spatial domain random access communication handling. In some aspects, a network entity may use spatial domain information to resolve a preamble sequence collision. The spatial domain information may include spatial domain information for respective random access communications (e.g., respective msg1 communications). For example, the network entity may determine that there are multiple network entities (e.g., multiple UEs) that have transmitted msg1 communications indicating the same preamble and using the same RACH occasion based on the spatial domain information of the msg1 communications. Based on determining that there are multiple network entities (e.g., multiple UEs) that have transmitted msg1 communications indicating the same preamble and using the same RACH occasion, the network entity may transmit RARs (e.g., msg2 communications) for respective msg1 communications from the multiple msg1 communications.

For example, the network entity may transmit an RAR (e.g., a msg2 communication) indicating a dedicated uplink resource allocation (e.g., for a msg3 communication) in response to each of detected msg1 communications (e.g., that indicate the same preamble, but are associated with different spatial domain information). In some examples, a UE may receive multiple RARs (e.g., multiple msg2 communications). In such examples, the UE may determine that a msg2 communication (from the multiple msg2 communications) is intended for the UE based on measurement information of respective msg2 communications. For example, the UE may use an uplink resource allocation (for a msg3 transmission) indicated by a msg2 communication that is associated with a highest signal strength. In some aspects, the UE may be configured to monitor for msg2 communications after receiving an initial msg2 communication (and/or after transmitting an initial msg3 communication).

Particular aspects of the subject matter described in this disclosure can be implemented to realize one or more of the following potential advantages. In some aspects, by using the spatial domain information of msg1 communications that indicate the same preamble and using the same RACH occasion, a network entity may be configured to resolve preamble sequence collisions. This reduces a latency associated with the multiple network entities or UEs establishing a network connection (e.g., by reducing a likelihood of a failure of the random access procedure that would have otherwise been caused by the preamble sequence collision). Additionally, this conserves network resources, processing resources, memory resources, and/or power resources that would have otherwise been used in association with performing additional random access procedures due to a RACH failure caused by the preamble sequence collision. Further, by the UE being configured to continue to monitor for msg2 communications after receiving an initial msg2 communication, a likelihood that the UE is enabled to detect and/or identify a msg2 communication that is transmitted in a spatial direction toward the UE (e.g., and is therefore associated with a best communication performance) is improved.

Various aspects of the disclosure are described more fully hereinafter with reference to the accompanying drawings. This disclosure may, however, be embodied in many different forms and is not limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, network entity, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the example concepts disclosed herein, both their organization and method of operation, together with associated example advantages, are described in the following description and in connection with the accompanying figures. Each of the figures is provided for the purposes of illustration and description, and not as a definition of the limits of the claims. Each of the figures is provided for the purposes of illustration and description, and not as a definition of the limits of the claims.

While aspects are described in the present disclosure by illustration to some examples, those skilled in the art understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described example aspects and example features may include additional example components and example features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example environment 100 in which apparatuses and/or methods described herein may be implemented, in accordance with the present disclosure. As shown in FIG. 1, the environment 100 may include a network entity 102, a network entity 104, and a network entity 106, that may communicate with one another via a network 108. The network entities 102, 104, and 106, may be dispersed throughout the network 108, and each network entity 102, 104, and 106 may be stationary and/or mobile. The network 108 may include wired communication connections, wireless communication connections, or a combination of wired and wireless communication connections.

The network 108 may include, for example, a cellular network (e.g., a Long-Term Evolution (LTE) network, a code division multiple access (CDMA) network, a 4G network, a 5G network, a 6G network, or another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In general, any number of networks 108 may be deployed in a given geographic area. Each network 108 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, Open-RAT NR, 5G, and/or 6G RAT networks may be deployed.

In some aspects, the environment 100 may include one or more non-terrestrial network (NTN) deployments in which a non-terrestrial wireless communication device may include a non-terrestrial network entity (e.g., the network entity 102, 104, and 106). The non-terrestrial network entity may include a network entity such as, for example, a UE (which may be referred to herein, interchangeably, as a "non-terrestrial UE"), a base station (referred to herein, interchangeably, as a "non-terrestrial base station"), and/or a relay station (referred to herein, interchangeably, as a "non-terrestrial relay station"), among other examples. As used herein, "NTN" may refer to a network for which access is facilitated by a non-terrestrial network entity such as a non-terrestrial UE, a non-terrestrial base station, and/or a non-terrestrial relay station, among other examples.

One or more of the network entities 102, 104, and 106 may be, include, or be included in, any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. Satellites may communicate directly and/or indirectly with other entities in the environment using satellite communication. The other entities may include UEs (e.g., terrestrial UEs and/or non-terrestrial UEs), other satellites in the one or more NTN deployments, other types of base stations (e.g., stationary and/or ground-based base stations), relay stations, and/or one or more components and/or devices included in a core network, among other examples.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity 102 may include a processing system 110. Similarly, the network entity 106 may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an "input" and "input information" may be used interchangeably. Similarly, as described herein, an "output" and "output information" may be used interchangeably. Any information generated by any component may be provided to one or more other systems or components of, for example, a network entity described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

For example, as shown in FIG. 1, the processing system 110 may include a (e.g., one or more) communication manager 114 and one or more communication interfaces 116. The communication manager 114 may be configured to perform one or more communication tasks as described herein. In some aspects, the communication manager 114 may direct the communication interface 120 and/or the processing system 110 to perform one or more communication tasks as described herein. Similarly, the processing system 112 may include a (e.g., one or more) communication manager 118 and one or more communication interfaces 120. The communication manager 118 may be configured to perform one or more communication tasks as described herein. In some aspects, the processing system 112 and/or the communication manager 118 may direct the communication interface 120 to perform one or more communication tasks as described herein. Although depicted, for clarity of description, with reference only to the network entities 102 and 104, any one or more of the network entities 102, 104, and 106 also may include a communication manager and a communication interface.

As used herein, "communication interface" refers to an interface that enables communication (e.g., wireless communication, wired communication, or a combination thereof) between a first network entity and a second network entity. A communication interface may include electronic circuitry that enables a network entity to transmit, receive, or otherwise perform the communication. A communication interface may be, be similar to, include, or be included in one or more components that are configured to enable communication between the first network entity and the second network entity. For example, a communication interface may include a transmission component, a reception component, and/or a transceiver, among other examples. For example, a communication interface may include one or more transceivers, one or more receivers, and/or one or more transmitters configured to communicate with other devices, such as via a wired connection, a wireless connection, or a combination of wired and wireless connections. In some examples, a communication interface may include one or more RF components, an RF front end, one or more antennas, one or more transmit or receive processors, a demodulation component, and/or a modulation component, among other examples. Communication interfaces are described in more detail elsewhere herein, such as in connection with FIG. 2.

As described herein, a network entity (e.g., the network entity 102 and/or the network entity 106) may be configured to perform one or more operations. Reference to a network entity being configured to perform one or more operations may refer to a processing system of the network entity being configured to perform the one or more operations and/or the processing system being configured to cause one or more components of the network entity to perform the one or more operations. For example, reference to the processing system being configured to perform one or more operations may refer to one or more components (or subcomponents) of the processing system performing the one or more operations. For example, the one or more components of the processing system may include at least one memory, at least one processor, and/or at least one communication interface, among other examples, that are configured to perform one or more (or all) of the one or more operations, and/or any combination thereof. Where reference is made to the network entity and/or the processing system being configured to perform operations, the network entity and/or the processing system may be configured to cause one component to perform all operations, or to cause more than one component to collectively perform the operations. When the network entity and/or the processing system is configured to cause more than one component to collectively perform the operations, each operation need not be performed by each of those components (e.g., different operations may be performed by different components) and/or each operation need not be performed in whole by only one component (e.g., different components may perform different sub-functions of an operation).

As described in more detail elsewhere herein, the network entity 102 may (e.g., the processing system 110 may, or the processing system 110 may cause the communication manager 114 and/or the communication interface 116 to) transmit, to a second network entity (e.g., the network entity 106), a first random access communication, wherein the first random access communication includes a random access preamble; receive, from the second network entity, a second random access communication including an identifier indicative of the random access preamble, wherein the second random access communication indicates a first resource allocation, and wherein the second random access communication is associated with first spatial domain information; receive, from the second network entity, a third random access communication including the identifier, wherein the third random access communication indicates a second resource allocation, and wherein the third random access communication is associated with second spatial domain information; and/or transmit, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information. Additionally, or alternatively, the network entity 102 and/or the communication manager 114 may perform one or more other operations described herein.

As described in more detail elsewhere herein, the network entity 106 may (e.g., the processing system 112 may, or the processing system 112 may cause the communication manager 114 and/or the communication interface 116 to) receive a first random access communication, wherein the first random access communication includes a random access preamble, and wherein the first random access communication is associated with first spatial domain information; receive a second random access communication, wherein the second random access communication includes the random access preamble, and wherein the second random access communication is associated with second spatial domain information; transmit, based on the first random access communication being associated with the first spatial domain information, a third random access communication indicating an identifier of the random access preamble and a first resource allocation for an uplink random access communication; and/or transmit, based on the second random access communication being associated with the second spatial domain information, a fourth random access communication indicating the identifier and a second resource allocation for the uplink random access communication. Additionally, or alternatively, the network entity 106 and/or the communication manager 118 may perform one or more other operations described herein.

The number and arrangement of entities shown in FIG. 1 are provided as one or more examples. In practice, there may be additional network entities and/or networks, fewer network entities and/or networks, different network entities and/or networks, or differently arranged network entities and/or networks than those shown in FIG. 1. Furthermore, the network entity 102, 104, and 106 may be implemented using a single apparatus or multiple apparatuses.

Figure 2:
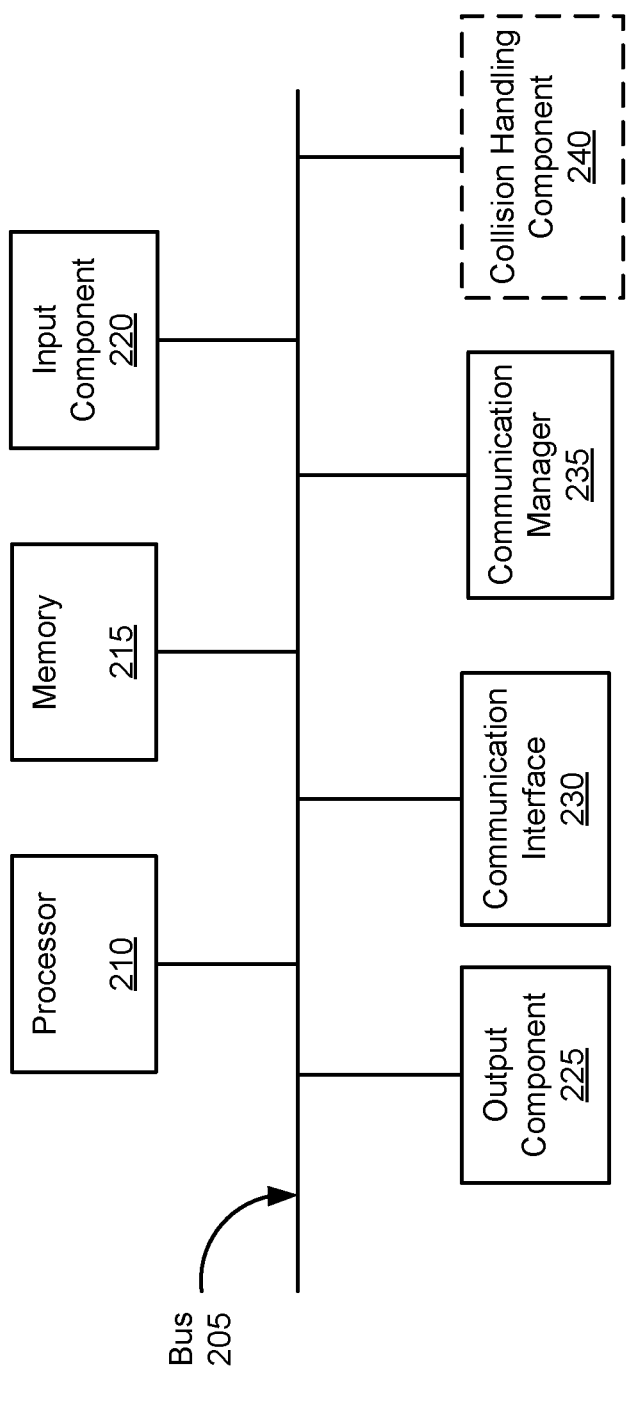
FIG. 2 is a diagram of example components of an apparatus, in accordance with the present disclosure.

FIG. 2 is a diagram of example components of an apparatus 200, in accordance with the present disclosure. The apparatus 200 may correspond to any one or more of the network entities 102, 104, and 106 or another network entity described herein. Additionally, or alternatively, any one or more of the network entities 102, 104, and 106 or another network entity described herein may include one or more apparatuses 200 and/or one or more components of the apparatus 200. For example, in some aspects, the apparatus 200 may include an apparatus (e.g., a device, a device component, a modem, a chip, and/or a set of device components, among other examples) that is configured to perform a wireless communication method, as described herein. In some aspects, the apparatus 200 may be a processing system (e.g., the processing system 110 and/or the processing system 112) of a network entity. As shown in FIG. 2, the apparatus 200 may include components such as a bus 205, a processor 210, a memory 215, an input component 220, an output component 225, a communication interface 230, a communication manager 235, and a collision handling component 240. Any one or more of the components 205, 210, 215, 220, 225 230, 235, and/or 240 may be implemented in hardware, software, or a combination of hardware and software.

The bus 205 includes a component that permits communication among the components of the apparatus 200. The processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), and/or another type of processing component. In some aspects, the processor 210 includes one or more processors capable of being programmed to perform a function.

The memory 215 includes a random-access memory, a read only memory (ROM), and/or another type of dynamic or static storage device (e.g., a flash memory, a magnetic memory, and/or an optical memory) that stores information and/or instructions for use by the processor 210. The memory 215 may store other information and/or software related to the operation and use of the apparatus 200. For example, the memory 215 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium.

The input component 220 includes a component that permits the apparatus 200 to receive information, such as via user input. For example, the input component 220 may be associated with a user interface as described herein (e.g., to permit a user to interact with the one or more features of the apparatus 200). The input component 220 may include a capacitive touchscreen display that can receive user inputs. The input component 220 may include a keyboard, a keypad, a mouse, a button, a switch, and/or a microphone, among other examples. Additionally, or alternatively, the input component 220 may include a sensor for sensing information (e.g., a vision sensor, a location sensor, an accelerometer, a gyroscope, and/or an actuator, among other examples). In some aspects, the input component 220 may include a camera (e.g., a high-resolution camera and/or a low-resolution camera, among other examples). The output component 225 may include a component that provides output from the apparatus 200 (e.g., a display, a speaker, and/or one or more light-emitting diodes (LEDs), among other examples).

The communication interface 230 may include a transmission component and/or a reception component. For example, the communication interface 230 may include a transceiver and/or one or more separate receivers and/or transmitters that enable the apparatus 200 to communicate with other devices, such as via a wired connection, a wireless connection, or a combination of wired and wireless connections. In some aspects, the communication interface may include one or more radio frequency reflective elements and/or one or more radio frequency refractive elements. The communication interface 230 may permit the apparatus 200 to receive information from another apparatus and/or provide information to another apparatus. For example, the communication interface 230 may include an Ethernet interface, an optical interface, a coaxial interface, an infrared interface, an RF interface, a universal serial bus (USB) interface, a Wi-Fi interface, a cellular network interface, a wireless modem, an inter-integrated circuit (I²C), and/or a serial peripheral interface (SPI), among other examples.

The communication manager 235 may include hardware, software, or a combination of hardware and software configured to cause the apparatus 200 to perform one or more communication tasks associated with the communication manager 114 and/or the communication interface 116 or the communication interface 230. Similarly, the communication manager 235 may include hardware, software, or a combination of hardware and software configured to cause the apparatus 200 to perform one or more communication tasks associated with the communication manager 118 and/or the communication interface 120 or the communication interface 230. In some aspects, the communication manager 235 may be, be similar to, include, or be included in, the communication manager 114 and/or the communication manager 118 depicted in FIG. 1. In some aspects, the communication manager 235 may include the processor 210, the memory 215, the input component 220, the output component 225, the communication interface 230, and/or the collision handling component 240, and/or one or more aspects thereof.

The collision handling component 240 may include hardware, software, or a combination of hardware and software configured to cause the apparatus 200 to perform one or more operations described herein associated with resolving or mitigating a collision associated with RACH resources (e.g., a PRACH resource collision). For example, the collision handling component 240 may be configured to perform one or more spatial domain collision resolution operations (e.g., for a RACH communication), as described in more detail elsewhere herein.

As indicated above, FIG. 2 is provided as an example. Other examples may differ from what is described with regard to FIG. 2.

As described above, in some aspects, the network 108 depicted in FIG. 1 may include a cellular network that includes a RAT. While some aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

Figure 3:
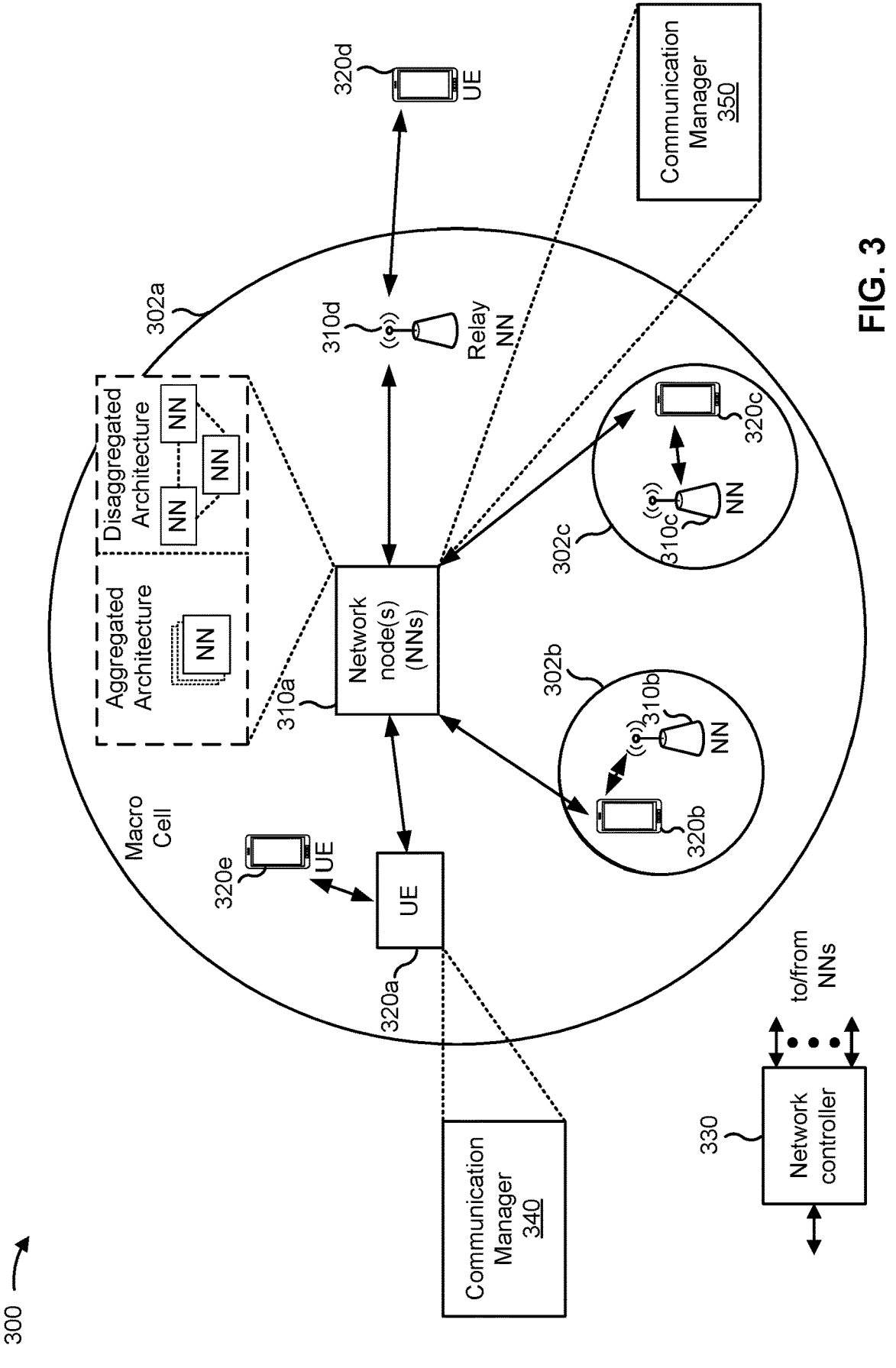
FIG. 3 is a diagram illustrating an example of a wireless network, in accordance with the present disclosure.

FIG. 3 is a diagram illustrating an example of a wireless network 300, in accordance with the present disclosure. The wireless network 300 may be or may include elements of a 4G (e.g., LTE) network, a 5G (e.g., NR) network, and/or, a 6G network, among other examples. The wireless network 300 may include one or more network nodes 310 (shown as a network node 310a, a network node 310b, a network node 310c, and a network node 310d), a UE 320 or multiple UEs 320 (shown as a UE 320a, a UE 320b, a UE 320c, a UE 320d, and a UE 320e), and/or other entities. A network node 310 is a network node that communicates with UEs 320. As shown, a network node 310 may include one or more network nodes. For example, a network node 310 may be an aggregated network node, meaning that the aggregated network node is configured to utilize a radio protocol stack that is physically or logically integrated within a single radio access network (RAN) node (e.g., within a single device or unit). As another example, a network node 310 may be a disaggregated network node (sometimes referred to as a disaggregated base station), meaning that the network node 310 is configured to utilize a protocol stack that is physically or logically distributed among two or more nodes (such as one or more CUs, one or more DUs, or one or more RUs).

In some examples, a network node 310 is or includes a network node that communicates with UEs 320 via a radio access link, such as an RU. In some examples, a network node 310 is or includes a network node that communicates with other network nodes 310 via a fronthaul link or a midhaul link, such as a DU. In some examples, a network node 310 is or includes a network node that communicates with other network nodes 310 via a midhaul link or a core network via a backhaul link, such as a CU. In some examples, a network node 310 (such as an aggregated network node 310 or a disaggregated network node 310) may include multiple network nodes, such as one or more RUs, one or more CUs, and/or one or more DUs. A network node 310 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 310 may be interconnected to one another or to one or more other network nodes 310 in the wireless network 300 through various types of fronthaul, midhaul, and/or backhaul interfaces, such as a direct physical connection, an air interface, or a virtual network, using any suitable transport network.

In some examples, a network node 310 may provide communication coverage for a particular geographic area. In the Third Generation Partnership Project (3GPP), the term "cell" can refer to a coverage area of a network node 310 and/or a network node subsystem serving this coverage area, depending on the context in which the term is used. A network node 310 may provide communication coverage for a macro cell, a pico cell, a femto cell, and/or another type of cell. A macro cell may cover a relatively large geographic area (e.g., several kilometers in radius) and may allow unrestricted access by UEs 320 with service subscriptions. A pico cell may cover a relatively small geographic area and may allow unrestricted access by UEs 320 with service subscriptions. A femto cell may cover a relatively small geographic area (e.g., a home) and may allow restricted access by UEs 320 having association with the femto cell (e.g., UEs 320 in a closed subscriber group (CSG)). A network node 310 for a macro cell may be referred to as a macro network node. A network node 310 for a pico cell may be referred to as a pico network node. A network node 310 for a femto cell may be referred to as a femto network node or an in-home network node. In the example shown in FIG. 3, the network node 310a may be a macro network node for a macro cell 302a, the network node 310b may be a pico network node for a pico cell 302b, and the network node 310c may be a femto network node for a femto cell 302c. A network node may support one or multiple (e.g., three) cells. In some examples, a cell may not necessarily be stationary, and the geographic area of the cell may move according to the location of a network node 310 that is mobile (e.g., a mobile network node).

In some aspects, the terms "base station" or "network entity" may refer to an aggregated base station, a disaggregated base station, an IAB node, a relay node, or one or more components thereof. For example, in some aspects, "base station" or "network entity" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the network node 310. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 300 may include one or more relay stations. A relay station is a network node that can receive a transmission of data from an upstream node (e.g., a network node 310 or a UE 320) and send a transmission of the data to a downstream node (e.g., a UE 320 or a network node 310). A relay station may be a UE 320 that can relay transmissions for other UEs 320. In the example shown in FIG. 3, the network node 310d (e.g., a relay network node) may communicate with the network node 310a (e.g., a macro network node) and the UE 320d in order to facilitate communication between the network node 310a and the UE 320d. A network node 310 that relays communications may be referred to as a relay station, a relay base station, a relay network node, a relay node, a relay, or the like.

The wireless network 300 may be a heterogeneous network that includes network nodes 310 of different types, such as macro network nodes, pico network nodes, femto network nodes, relay network nodes, or the like. These different types of network nodes 310 may have different transmit power levels, different coverage areas, and/or different impacts on interference in the wireless network 300. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 330 may couple to or communicate with a set of network nodes 310 and may provide coordination and control for these network nodes 310. The network controller 330 may communicate with the network nodes 310 via a backhaul communication link or a midhaul communication link. The network nodes 310 may communicate with one another directly or indirectly via a wireless or wireline backhaul communication link. In some aspects, the network controller 330 may be a CU or a core network device, or may include a CU or a core network device.

For example, in some aspects, the wireless network 300 may be, include, or be included in a wireless backhaul network, sometimes referred to as an IAB network. In an IAB network, at least one network entity (e.g., network node 310) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 320) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target network entity (e.g., a UE and/or a base station). In this way, inter-link interference may be reduced.

An IAB network may include an IAB donor that connects to a core network via a wired connection (e.g., a wireline backhaul). For example, an Ng interface of an IAB donor may terminate at a core network. Additionally, or alternatively, an IAB donor may connect to one or more devices of the core network that provide a core access and mobility management function (AMF). In some aspects, an IAB donor may include a network node 310, such as an anchor base station. An IAB donor may include a CU, which may perform access node controller (ANC) functions and/or AMF functions. The CU may configure a DU of the IAB donor and/or may configure one or more IAB nodes (e.g., a mobile termination (MT) function and/or a DU function of an IAB node) that connect to the core network via the IAB donor. Thus, a CU of an IAB donor may control and/or configure the entire IAB network (or a portion thereof) that connects to the core network via the IAB donor, such as by using control messages and/or configuration messages (e.g., a radio resource control (RRC) configuration message or an F1 application protocol (F1AP) message).

The MT functions of an IAB node (e.g., a child node) may be controlled and/or scheduled by another IAB node (e.g., a parent node of the child node) and/or by an IAB donor. The DU functions of an IAB node (e.g., a parent node) may control and/or schedule other IAB nodes (e.g., child nodes of the parent node) and/or UEs 320. Thus, a DU may be referred to as a scheduling node or a scheduling component, and an MT may be referred to as a scheduled node or a scheduled component. In some aspects, an IAB donor may include DU functions and not MT functions. That is, an IAB donor may configure, control, and/or schedule communications of IAB nodes and/or UEs 320. A UE 320 may include only MT functions, and not DU functions. That is, communications of a UE 320 may be controlled and/or scheduled by an IAB donor and/or an IAB node (e.g., a parent node of the UE 320).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor or an IAB node, and a child node may be an IAB node or a UE 320. Communications of an MT function of a child node may be controlled and/or scheduled by a parent node of the child node.

A link between a UE 320 and an IAB donor, or between a UE 320 and an IAB node, may be referred to as an access link. An access link may be a wireless access link that provides a UE 320 with radio access to a core network via an IAB donor, and optionally via one or more IAB nodes. Thus, the wireless network 300 may be referred to as a multi-hop network or a wireless multi-hop network.

A link between an IAB donor and an IAB node or between two IAB nodes may be referred to as a backhaul link. A backhaul link may be a wireless backhaul link that provides an IAB node with radio access to a core network via an IAB donor, and optionally via one or more other IAB nodes. In an IAB network, network resources for wireless communications (e.g., time resources, frequency resources, and/or spatial resources) may be shared between access links and backhaul links. In some aspects, a backhaul link may be a primary backhaul link or a secondary backhaul link (e.g., a backup backhaul link). In some aspects, a secondary backhaul link may be used if a primary backhaul link fails, becomes congested, and/or becomes overloaded, among other examples.

The UEs 320 may be dispersed throughout the wireless network 300, and each UE 320 may be stationary or mobile. A UE 320 may include, for example, an access terminal, a terminal, a mobile station, and/or a subscriber unit. A UE 320 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 320 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 320 may be considered Internet-of-Things (IoT) devices, and/or may be implemented as NB-IoT (narrowband IoT) devices. Some UEs 320 may be considered a Customer Premises Equipment. A UE 320 may be included inside a housing that houses components of the UE 320, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

Some network nodes may have a reduced feature set compared to other network nodes. A network node with a reduced feature set may be referred to as a reduced capability (RedCap) node, a low-tier node, an NR-Lite node, an IoT node, an ambient IoT node, a passive node, a terminal (e.g., a radio frequency identification (RFID) device, a tag, or a similar device), and/or an energy-harvesting-capable node, among other examples. For example, a node with a reduced feature set may support a lower maximum modulation and coding scheme (MCS) than other nodes (e.g., quadrature phase shift keying (QPSK) or the like as compared to 256-quadrature amplitude modulation (QAM) or the like), may support a lower maximum transmit power, may have a less advanced beamforming capability (e.g., may not be capable of forming as many beams as other nodes), may require a longer processing time, may include less hardware (e.g., fewer antennas, fewer RF components, fewer transmit antennas, and/or fewer receive antennas), and/or may not be capable of communicating on as wide of a maximum bandwidth, among other examples.

In general, any number of wireless networks 300 may be deployed in a given geographic area. Each wireless network 300 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 320 may communicate directly using one or more sidelink channels (e.g., without using a network node 310 as an intermediary to communicate with one another). For example, the UE 320a may communicate with a UE 320e via one or more sidelink channels. For example, the UEs 320 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 320 may perform scheduling operations, resource selection operations, and/or other operations described elsewhere herein as being performed by the network node 310.

Devices of the wireless network 300 may communicate using the electromagnetic spectrum, which may be subdivided by frequency or wavelength into various classes, bands, channels, or the like. For example, devices of the wireless network 300 may communicate using one or more operating bands. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 may be referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, the term "sub-6 GHz" or the like, if used herein, may broadly represent frequencies that may be less than 6 GHz, may be within FR1, or may include mid-band frequencies. Further, unless specifically stated otherwise, the term "millimeter wave" or the like, if used herein, may broadly represent frequencies that may include mid-band frequencies, may be within FR2, FR4, FR4-a or FR4-1, and/or FR5, or may be within the EHF band. The frequencies included in these operating bands (e.g., FR1, FR2, FR3, FR4, FR4-a. FR4-1, and/or FR5) may be modified, and techniques described herein are applicable to those modified frequency ranges.

As described above, in some aspects, a network entity (e.g., the network entity 102, 104, and/or 106 depicted in FIG. 1) may be implemented in a wireless communication environment. For example, in some aspects, the network node may be implemented as a UE, a base station, relay device, and/or TRP, among other examples. In some such aspects, as shown in FIG. 3, the UE 320a may include a communication manager 340 and/or a transceiver and the network node 310a may include a communication manager 350 and/or a transceiver. In some aspects, the communication manager 340 and/or 350 may be, be similar to, include, or be included in, the communication manager 114 and/or the communication manager 118 depicted in FIG. 1 and/or the communication manager 235 depicted in FIG. 2. In some aspects, the transceiver(s) may be, be similar to, include, or be included in, the communication interface 116 and/or the communication interface 120 depicted in FIG. 1. In some aspects, the transceiver(s) may include, or be included in, the communication interface 230 depicted in FIG. 2. In some aspects, the UE 320a may include a processing system (e.g., similar to the processing system 110 and/or the processing system 112).

In some aspects, the UE 320 may include a communication manager 340. As described in more detail elsewhere herein, the communication manager 340 may transmit, to a network entity, a first random access communication, wherein the first random access communication includes a random access preamble; receive, from the network entity, a second random access communication including an identifier indicative of the random access preamble, wherein the second random access communication indicates a first resource allocation, and wherein the second random access communication is associated with first spatial domain information; receive, from the network entity, a third random access communication including the identifier, wherein the third random access communication indicates a second resource allocation, and wherein the third random access communication is associated with second spatial domain information; and/or transmit, to the network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information. Additionally, or alternatively, the communication manager 340 may perform one or more other operations described herein.

In some aspects, the network node 310 may include a communication manager 350. As described in more detail elsewhere herein, the communication manager 350 may receive a first random access communication, wherein the first random access communication includes a random access preamble, and wherein the first random access communication is associated with first spatial domain information; receive a second random access communication, wherein the second random access communication includes the random access preamble, and wherein the second random access communication is associated with second spatial domain information; transmit, based on the first random access communication being associated with the first spatial domain information, a third random access communication indicating an identifier of the random access preamble and a first resource allocation for an uplink random access communication; and/or transmit, based on the second random access communication being associated with the second spatial domain information, a fourth random access communication indicating the identifier and a second resource allocation for the uplink random access communication. Additionally, or alternatively, the communication manager 350 may perform one or more other operations described herein.

As indicated above, FIG. 3 is provided as an example. Other examples may differ from what is described with regard to FIG. 3.

Figure 4:
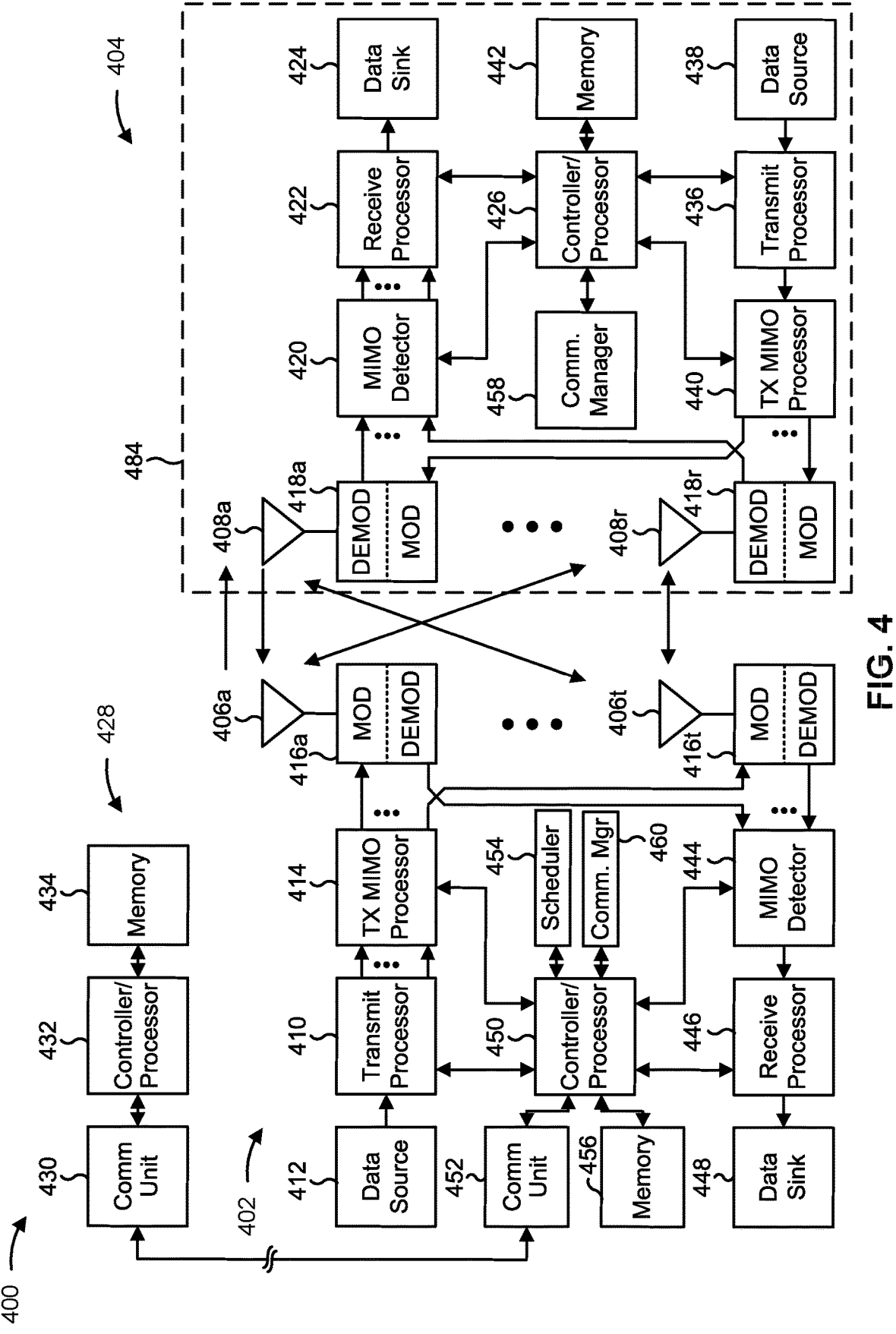
FIG. 4 is a diagram illustrating an environment including a first network entity in wireless communication with a second network entity, in accordance with the present disclosure.

FIG. 4 is a diagram illustrating an environment 400 including a network entity 402 in wireless communication with a network entity 404 (e.g., via a network such as the network 108 depicted in FIG. 1 and/or the wireless network 300 depicted in FIG. 3), in accordance with the present disclosure. The network entity 402 may be equipped with a set of antennas 406a through 406t, such as T antennas (T≥1). The network entity 404 may be equipped with a set of antennas 408a through 408r, such as R antennas (R≥1).

At the network entity 402, a transmit processor 410 may receive data, from a data source 412, intended, or otherwise destined, for the network entity 404 (or a set of network entities 404). The transmit processor 410 may select one or more CMSs for the network entity 404 based on one or more channel quality indicators (CQIs) received from that network entity 404. The network entity 402 may process (e.g., encode and modulate) the data for the network entity 404 based on the MCS(s) selected for the network entity 404 and may provide data symbols for the network entity 404. The transmit processor 410 may process system information (e.g., for semi-static resource partitioning information (SRPI)) and control information (e.g., CQI requests, grants, and/or upper layer signaling) and provide overhead symbols and control symbols. The transmit processor 410 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 414 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 416a through 416t (e.g., T modems). For example, each output symbol stream may be provided to a modulator component (shown as MOD) of a modem of the set of modems 416a through 416t. Each modem of the set of modems 416a through 416t may use a respective modulator component to process a respective output symbol stream (e.g., for OFDM) to obtain an output sample stream. Each modem of the set of modems 416a through 416t may further use a respective modulator component to process (e.g., convert to analog, amplify, filter, and/or upconvert) the output sample stream to obtain a signal. One or more modems of the set of modems 416a through 416t may transmit a set of signals (e.g., T signals) via a corresponding antenna of the set of antennas 406a through 406t. The signal may include, for example, a downlink signal.

At the network entity 404, one or more antennas of the set of antennas 408a through 408r may receive the signals from the network entity 402 and/or network nodes and may provide a set of received signals (e.g., R received signals) to one or more modems of a set of modems 418a through 418r (e.g., R modems). For example, each received signal may be provided to a demodulator component (shown as DEMOD) of a respective modem of the set of modems 418a through 418r. Each modem of the set of modems 418a through 418r may use a respective demodulator component to condition (e.g., filter, amplify, downconvert, and/or digitize) a received signal to obtain input samples. Each modem of the set of modems 418a through 418r may use a demodulator component to further process the input samples (e.g., for OFDM) to obtain received symbols. A MIMO detector 420 may obtain received symbols from one or more modems of the set of modems 418a through 418r, may perform MIMO detection on the received symbols if applicable, and may provide detected symbols.

A receive processor 422 may process (e.g., demodulate and decode) the detected symbols, may provide decoded data for the network entity 404 to a data sink 424, and may provide decoded control information and system information to a controller/processor 426. The term "controller/processor" may refer to one or more controllers, one or more processors, or a combination thereof. The controller/processor 426 may be, be similar to, include, or be included in, the processor 210 depicted in FIG. 2. The controller/processor 426 may determine a reference signal received power (RSRP) parameter, a received signal strength indicator (RSSI) parameter, a reference signal received quality (RSRQ) parameter, and/or a CQI parameter, among other examples.

A network controller 428 may include a communication unit 430, a controller/processor 432, and a memory 434. The network controller 428 may be, be similar to, include, or be included in, the network controller 330 depicted in FIG. 3. The network controller 428 may include, for example, one or more devices in a core network. The network controller 428 may communicate with the network entity 402 via the communication unit 430.

One or more antennas (e.g., antennas 406a through 406t and/or antennas 408a through 408r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings, such as a housing 484), a set of coplanar antenna elements, a set of non-coplanar antenna elements, and/or one or more antenna elements coupled to one or more transmission and/or reception components, such as one or more components of FIG. 4.

Similarly, at the network entity 404, a transmit processor 436 may receive and process data from a data source 438 and control information (e.g., for reports that include RSRP, RSSI, RSRQ, and/or CQI) from the controller/processor 426. The transmit processor 436 may generate reference symbols for one or more reference signals. The symbols from the transmit processor 436 may be precoded by a TX MIMO processor 440 if applicable, and further processed by one or more of the set of modems 418a through 418r (e.g., for DFT-s-OFDM or CP-OFDM), and transmitted to the network entity 402. In some examples, each modem of the set of modems 418a through 418r of the network entity 404 may include a modulator and a demodulator. The network entity 404 may include a communication manager 458. The communication manager 458 may be, or may be similar to, the communication manager 114, the communication manager 118, the communication manager 235, the communication manager 340, and/or the communication manager 350. In some examples, the network entity 404 includes a transceiver. The transceiver may include any combination of the antenna(s) 408a through 408r, the modem(s) 418a through 418r, the MIMO detector 420, the receive processor 422, the transmit processor 436, and/or the TX MIMO processor 440. The transceiver may be, be similar to, include, or be included in, the communication interface 116 and/or the communication interface 120 depicted in FIG. 1 and/or the communication interface 230 depicted in FIG. 2. The transceiver may be used by a processor (e.g., the controller/processor 426) and/or a memory 442 to perform aspects of any of the methods described herein (e.g., with reference to FIGS. 9-14).

At the network entity 402, the signals from network entity 404 and/or other network nodes may be received by one or more antennas of the set of antennas 406a through 406t, processed by one or more modems of the set of modems 416a through 416t (e.g., a demodulator component, shown as DEMOD), detected by a MIMO detector 444 if applicable, and further processed by a receive processor 446 to obtain decoded data and control information sent by the network entity 404. The receive processor 446 may provide the decoded data to a data sink 448 and provide the decoded control information to a controller/processor 450. The network entity 402 may include a communication unit 452 and may communicate with the network controller 428 via the communication unit 452. The network entity 402 may include a communication manager 460. The communication manager 460 may be, or may be similar to, the communication manager 114, the communication manager 118, the communication manager 235, the communication manager 340, and/or the communication manager 350. The network entity 402 may include a scheduler 454 to schedule one or more network entities 404 for downlink and/or uplink communications. In some examples, one or more modems of the set of modem 416a through 416t of the network entity 402 may include a modulator and a demodulator. In some examples, the network entity 402 includes a transceiver. The transceiver may include any combination of the antenna(s) 406a through 406t, the modem(s) 416a through 416t, the MIMO detector 444, the receive processor 446, the transmit processor 410, and/or the TX MIMO processor 414. The transceiver may be, be similar to, include, or be included in, the communication interface 116 and/or the communication interface 120 depicted in FIG. 1 and/or the communication interface 230 depicted in FIG. 2. The transceiver may be used by a processor (e.g., the controller/processor 450) and a memory 456 to perform aspects of any of the methods described herein (e.g., with reference to FIGS. 9-14).

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The controller/processor 450 of the network entity 402, the controller/processor 426 of the network entity 404, and/or any other component(s) of FIG. 4 may perform one or more techniques associated with spatial domain random access communication handling, as described in more detail elsewhere herein. For example, the controller/processor 450 of the network entity 402, the controller/processor 426 of the network entity 404, and/or any other component(s) of FIG. 4 may perform or direct operations of, for example, process 1100 of FIG. 12, process 1200 of FIG. 12, and/or other processes as described herein. The memory 442 and the memory 456 may store data and program codes for the network entity 402 and the network entity 404, respectively. In some examples, the memory 442 and/or the memory 456 may include a non-transitory computer-readable medium storing one or more instructions (e.g., code and/or program code) for wireless communication. For example, the one or more instructions, when executed (e.g., directly, or after compiling, converting, and/or interpreting) by one or more respective processors of the network entity 402 and/or the network entity 404, may cause the one or more processors, the network entity 404, and/or the network entity 402 to perform or direct operations of, for example, process 1100 of FIG. 12, process 1200 of FIG. 12, and/or other processes as described herein. In some examples, executing instructions may include running the instructions, converting the instructions, compiling the instructions, and/or interpreting the instructions, among other examples.

In some aspects, a first network entity (e.g., the network entity 402 or the network entity 404) includes means for transmitting, to a second network entity, a first random access communication, wherein the first random access communication includes a random access preamble; means for receiving, from the second network entity, a second random access communication including an identifier indicative of the random access preamble, wherein the second random access communication indicates a first resource allocation, and wherein the second random access communication is associated with first spatial domain information; means for receiving, from the second network entity, a third random access communication including the identifier, wherein the third random access communication indicates a second resource allocation, and wherein the third random access communication is associated with second spatial domain information; and/or means for transmitting, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information. In some aspects, the means for the first network entity to perform operations described herein may include, for example, one or more of a processing system (e.g., the processing system 110 or the processing system 112), the apparatus 200, one or more components of the apparatus 200, communication manager 458, antenna 408, modem 418, MIMO detector 420, receive processor 422, transmit processor 436, TX MIMO processor 440, controller/processor 426, memory 442, the communication interface 116, the communication interface 120, and/or the communication interface 230, among other examples.

In some aspects, a first network entity (e.g., the network entity 402 or the network entity 404) includes means for receiving a first random access communication, wherein the first random access communication includes a random access preamble, and wherein the first random access communication is associated with first spatial domain information; means for receiving a second random access communication, wherein the second random access communication includes the random access preamble, and wherein the second random access communication is associated with second spatial domain information; means for transmitting, based on the first random access communication being associated with the first spatial domain information, a third random access communication indicating an identifier of the random access preamble and a first resource allocation for an uplink random access communication; and/or means for transmitting, based on the second random access communication being associated with the second spatial domain information, a fourth random access communication indicating the identifier and a second resource allocation for the uplink random access communication. In some aspects, the means for the first network entity to perform operations described herein may include, for example, one or more of a processing system (e.g., the processing system 110 or the processing system 112), the apparatus 200, one or more components of the apparatus 200, communication manager 460, transmit processor 410, TX MIMO processor 414, modem 416, antenna 406, MIMO detector 444, receive processor 446, controller/processor 450, memory 456, scheduler 454, the communication interface 116, the communication interface 120, and/or the communication interface 230, among other examples.

While blocks in FIG. 4 are illustrated as distinct components, the functions described above with respect to the blocks may be implemented in a single hardware, software, or combination component or in various combinations of components. For example, the functions described with respect to the transmit processor 436, the receive processor 422, and/or the TX MIMO processor 440 may be performed by or under the control of the controller/processor 426. Any number of other combination of various combinations of components depicted in FIG. 4 may be considered to be within the ambit of the present disclosure.

As indicated above, FIG. 4 is provided as an example. Other examples may differ from what is described with regard to FIG. 4.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network entities. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

As used herein, a first network entity "outputting" or "transmitting" a communication to a second network entity may refer to a direct transmission (for example, from the first network entity to the second network entity) or an indirect transmission via one or more other network entities or devices. For example, if the first network entity is a DU, an indirect transmission to the second network entity may include the DU outputting or transmitting a communication to an RU and the RU transmitting the communication to the second network entity, or may include causing the RU to transmit the communication (e.g., triggering transmission of a physical layer reference signal). Similarly, the second network entity "transmitting" a communication to the first network entity may refer to a direct transmission (e.g., from the second network entity to the first network entity) or an indirect transmission via one or more other network entities or devices. For example, if the first network entity is a DU, an indirect transmission to the first network entity may include the second network entity transmitting a communication to an RU and the RU transmitting the communication to the DU. Similarly, the first network entity "obtaining" a communication may refer to receiving a transmission carrying the communication directly (for example, from the second network entity to the first network entity) or receiving the communication (or information derived from reception of the communication) via one or more other network entities or devices.

Figure 5:
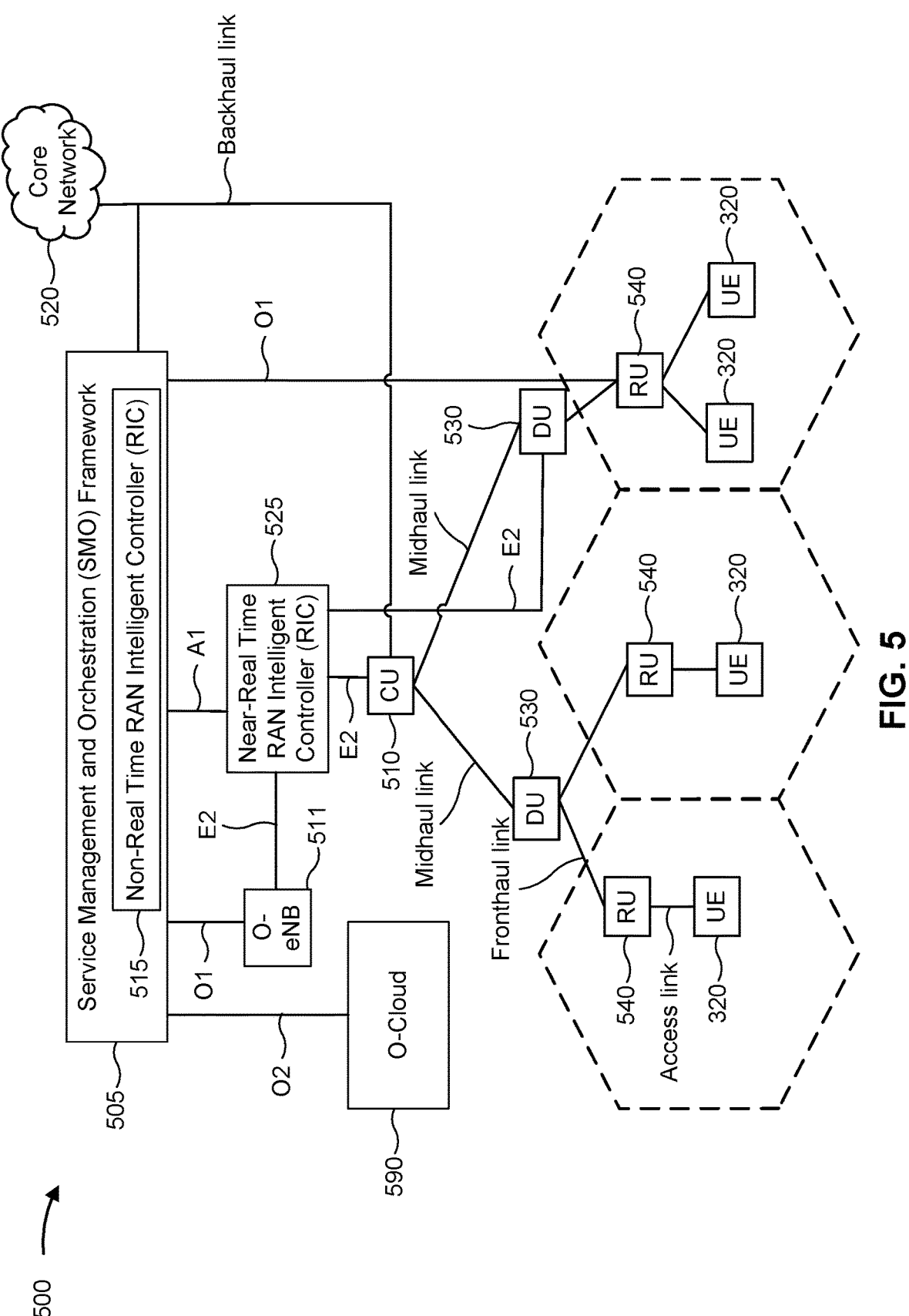
FIG. 5 is a diagram illustrating an example disaggregated base station architecture, in accordance with the present disclosure.

FIG. 5 is a diagram illustrating an example disaggregated base station architecture 500, in accordance with the present disclosure. The disaggregated base station architecture 500 may include a CU 510 that can communicate directly with a core network 520 via a backhaul link, or indirectly with the core network 520 through one or more disaggregated control units (such as a Near-RT RIC 525 via an E2 link, or a Non-RT RIC 515 associated with a Service Management and Orchestration (SMO) Framework 505, or both). A CU 510 may communicate with one or more DUs 530 via respective midhaul links, such as through F1 interfaces. Each of the DUs 530 may communicate with one or more RUs 540 via respective fronthaul links. Each of the RUs 540 may communicate with one or more UEs 320 via respective RF access links. In some implementations, a UE 320 may be simultaneously served by multiple RUs 540.

Each of the units, including the CUs 510, the DUs 530, the RUs 540, as well as the Near-RT RICs 525, the Non-RT RICs 515, and the SMO Framework 505, may include one or more interfaces or be coupled with one or more interfaces configured to receive or transmit signals, data, or information (collectively, signals) via a wired or wireless transmission medium.

Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 510 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 510. The CU 510 may be configured to handle user plane functionality (for example, Central Unit-User Plane (CU-UP) functionality), control plane functionality (for example, Central Unit-Control Plane (CU-CP) functionality), or a combination thereof. In some implementations, the CU 510 can be logically split into one or more CU-UP units and one or more CU-CP units. A CU-UP unit can communicate bidirectionally with a CU-CP unit via an interface, such as the E1 interface when implemented in an O-RAN configuration. The CU 510 can be implemented to communicate with a DU 530, as necessary, for network control and signaling.

Each DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 530 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 530, or with the control functions hosted by the CU 510.

Each RU 540 may implement lower-layer functionality. In some deployments, an RU 540, controlled by a DU 530, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 540 can be operated to handle over the air (OTA) communication with one or more UEs 320. In some implementations, real-time and non-real-time aspects of control and user plane communication with the RU(s) 540 can be controlled by the corresponding DU 530. In some scenarios, this configuration can enable each DU 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements, which may be managed via an operations and maintenance interface (such as an O1 interface). For virtualized network elements, the SMO Framework 505 may be configured to interact with a cloud computing platform (such as an open cloud (O-Cloud) platform 590) to perform network element life cycle management (such as to instantiate virtualized network elements) via a cloud computing platform interface (such as an O2 interface). Such virtualized network elements can include, but are not limited to, CUs 510, DUs 530, RUs 540, non-RT RICs 515, and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with each of one or more RUs 540 via a respective O1 interface. The SMO Framework 505 also may include a Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via an O1 interface) or via creation of RAN management policies (such as A1 interface policies).

As indicated above, FIG. 5 is provided as an example. Other examples may differ from what is described with regard to FIG. 5.

Figure 6:
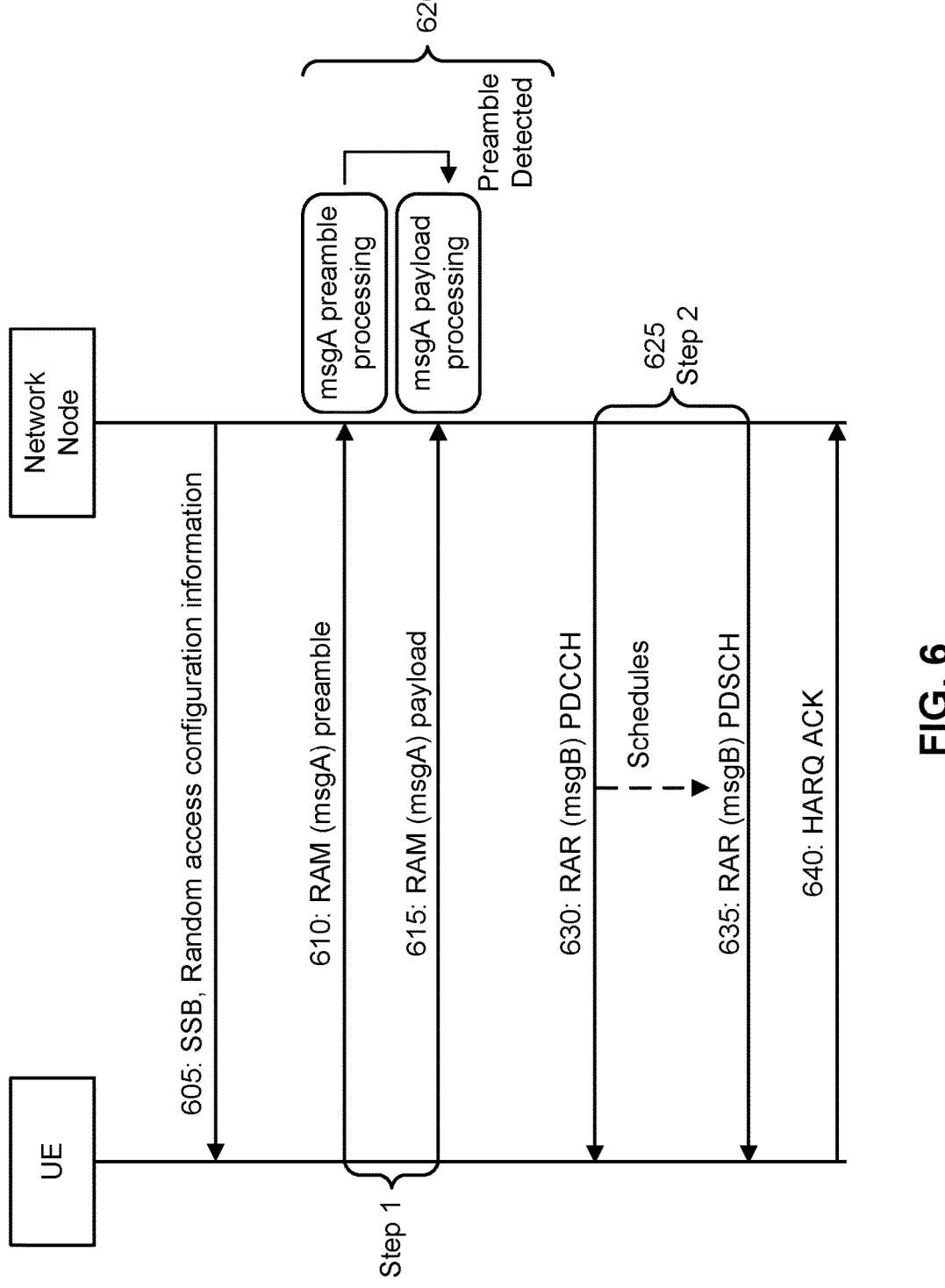
FIG. 6 is a diagram illustrating an example of a two-step random access procedure, in accordance with the present disclosure.

FIG. 6 is a diagram illustrating an example 600 of a two-step random access procedure, in accordance with the present disclosure. As shown in FIG. 6, a network node (e.g., a first network entity) and a UE (e.g., a second network entity) may communicate with one another to perform the two-step random access procedure (e.g., a two-step RACH procedure).

As shown by reference number 605, the network node may transmit, and the UE may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 610, the UE may transmit, and the network node may receive, a RAM preamble. As shown by reference number 615, the UE may transmit, and the network node may receive, a RAM payload. As shown, the UE may transmit the RAM preamble and the RAM payload to the network node as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 620, the network node may receive the RAM preamble transmitted by the UE. If the network node successfully receives and decodes the RAM preamble, then the network node may then receive and decode the RAM payload.

As shown by reference number 625, the network node may transmit an RAR (sometimes referred to as an RAR message). As shown, the network node may transmit the RAR message as part of a second step of the two-step random access procedure. In some examples, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 630, as part of the second step of the two-step random access procedure, the network node may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 635, as part of the second step of the two-step random access procedure, the network node may transmit the PDSCH communication for the RAR, as scheduled by the PDCCH communication. The RAR may be included in a medium access control (MAC) protocol data unit (PDU) of the PDSCH communication. As shown by reference number 640, if the UE successfully receives the RAR, then the UE may transmit a hybrid automatic repeat request (HARQ) acknowledgement (ACK).

As indicated above, FIG. 6 is provided as an example. Other examples may differ from what is described with regard to FIG. 6.

Figure 7:
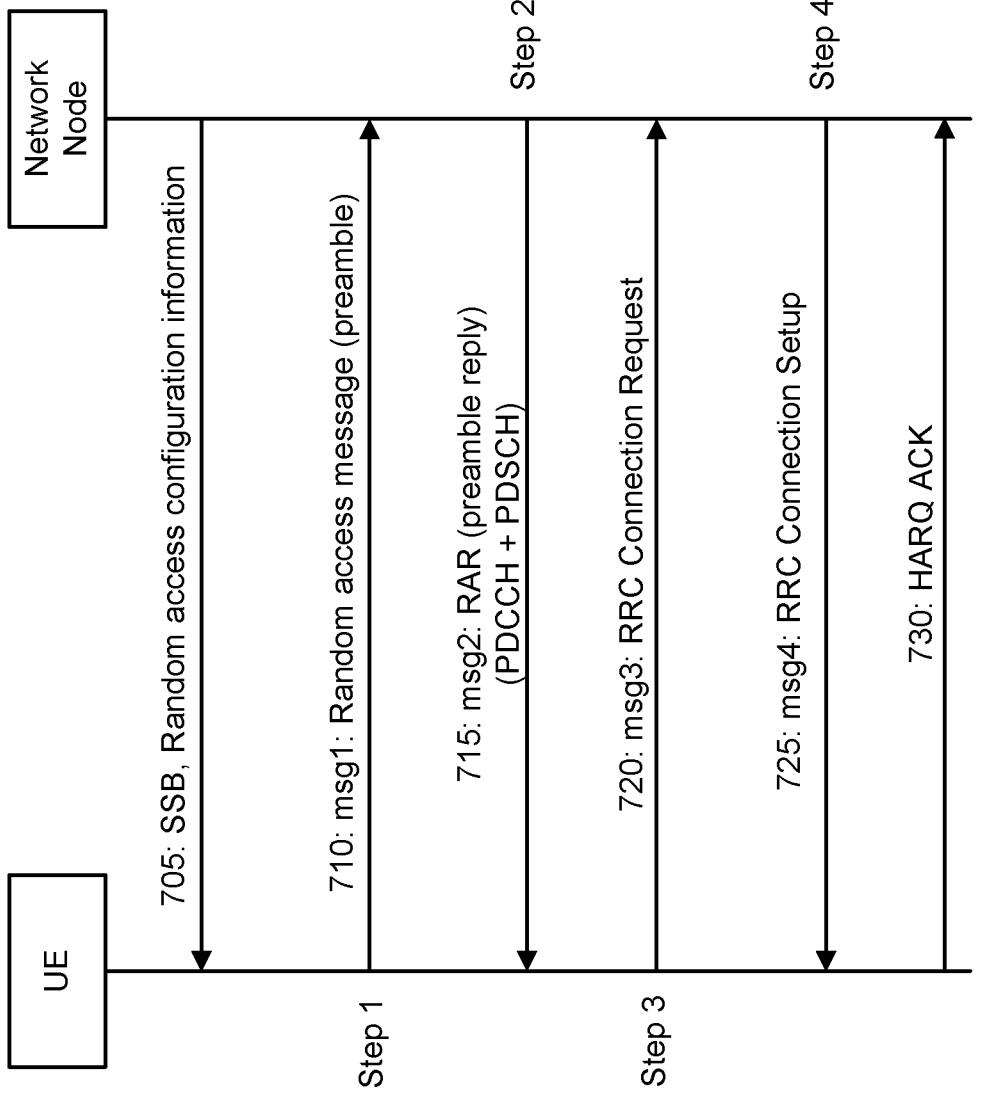
FIG. 7 is a diagram illustrating an example of a four-step random access procedure, in accordance with the present disclosure.

FIG. 7 is a diagram illustrating an example 700 of a four-step random access procedure, in accordance with the present disclosure. As shown in FIG. 7, a network node (e.g., a first network entity) and a UE (e.g., a second network entity) may communicate with one another to perform the four-step random access procedure (e.g., a four-step RACH procedure).

As shown by reference number 705, the network node may transmit, and the UE may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 710, the UE may transmit a RAM, which may include a preamble (sometimes referred to as a random access preamble, a PRACH preamble, or a RAM preamble). The message that includes the preamble may be referred to as a message 1, msg1. MSG1, a first message, or an initial message in a four-step random access procedure. The random access message may include a random access preamble identifier.

As shown by reference number 715, the network node may transmit, and the UE may receive, an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE in msg1). Additionally, or alternatively, the RAR may indicate a resource allocation to be used by the UE to transmit message 3 (msg3).

In some aspects, as part of the second step of the four-step random access procedure, the network node may transmit, and the UE may receive, a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the network node may transmit the PDSCH communication for the RAR, as scheduled by the PDCCH communication. The RAR may be included in a MAC PDU of the PDSCH communication.

As shown by reference number 720, the UE may transmit, and the network node may receive, an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 725, the network node may transmit, and the UE may receive, an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 730, if the UE successfully receives the RRC connection setup message, then the UE may transmit a HARQ ACK.

In some examples, two or more UEs may transmit a RAM (e.g., a msg1) to the network node using the same preamble (e.g., the same PRACH preamble) and the same RACH occasion (e.g., using the same time domain and/or frequency domain resources to transmit the RAM). A scenario in which two or more UEs transmit a RAM using the same preamble and the same RACH occasion may be referred to as a RACH collision, a PRACH collision, a preamble collision, a sequence (e.g., a preamble sequence) collision, and/or a sequence domain collision, among other examples. In such examples, the network node may be unable to distinguish between the two or more UEs. As a result, the network node may (e.g., in response to receiving multiple RAMs with the same preamble and via the same RACH occasion) consider a single UE to be detected. The network node may transmit a single RAR (e.g., in response to the multiple RAMs). Each UE (from the two or more UEs) may determine that a resource allocation indicated by the single RAR is granted for that UE. For example, each UE will treat an RAR uplink grant (e.g., indicated in the msg2) as allocated to itself (because the RAR uplink grant will use the preamble transmitted by each UE as a temporary ID to distinguish UEs). As a result, each UE (from the two or more UEs) may transmit a msg3 using the resource allocation indicated by the single RAR (e.g., each UE may use the same RAR uplink grant to transmit a msg3).

As a result, the network node may perform one or more contention resolution operations to distinguish the two or more UEs that transmit respective msg3s using the same RAR uplink grant. This may consume processing resources, memory resources, and/or power resources associated with performing the contention resolution. In some cases, because the two or more UEs that transmit respective msg3s using the same RAR uplink grant, the network node may fail to receive one or more of the msg3s (e.g., due to interference or other factors). As a result, UE(s) that transmit the failed msg3 communications may be unable to establish a connection with the network node, resulting in the UE re-initiating the RACH procedure (e.g., thereby increasing latency associated with establishing a network connection and consuming network resources, processing resources, memory resources, and/or power resources associated with performing another RACH procedure).

As indicated above, FIG. 7 is provided as an example. Other examples may differ from what is described with regard to FIG. 7.

FIG. 8 is a diagram illustrating an example 800 of collision probabilities for a random access procedure, in accordance with the present disclosure. The graph depicted in FIG. 8 shows collision probabilities (e.g., a probability of a PRACH collision described above in connection with FIG. 7) for different quantities of RACH resources. The RACH resources may be preamble sequences (e.g., available for each RACH occasion).

As shown in FIG. 8, as the quantity of available RACH resources increases, the collision probability and/or average quantity of collisions (e.g., over a period of time) decreases. Additionally, as the average quantity of devices operating in a given cell (e.g., "Avg users" shown in FIG. 8) decreases, the collision probability and/or average quantity of collisions (e.g., over a period of time) decreases. However, as shown in FIG. 8, the relationship between the collision probability and the quantity of RACH resources is not linear. Therefore, to cause a decrease in the collision probability, a network entity may significantly increase the quantity of available RACH resources. This may result in wasted network resources because a resource usage of the increased quantity of available RACH resources decreases.

In some examples, if a quantity of available preamble sequences is increased (e.g., assuming the same quantity of available time/frequency resources and/or the same quantity of available RACH occasions), the collision probability and/or average quantity of collisions may decrease. However, increasing the quantity of available preamble sequences may also result in an increased quantity of missed detections and/or false alarm events for RACH procedures. A missed detection may be associated with a network entity failing to detect a transmitted preamble sequence. A false alarm event may be associated with a network entity incorrectly detecting a preamble sequence that is not associated with a transmission from a UE. As the quantity of available preamble sequences increases, a likelihood that a network entity has missed detections and/or false alarm events increases.

In some examples, time domain techniques for PRACH collision resolution may be utilized by a network entity. For example, for the same preamble sequence, the network entity may detect multiple UEs based on a separation of signals in the time domain. For example, the network entity may treat different arrival paths of respective signals carrying the same preamble sequence as different UEs (e.g., rather than considering the different paths as associated with a signal transmitted by a single UE). However, the time domain techniques may not address cases where two signals arrive at the network entity at approximately the same time. Further, the time domain techniques may result in errors when a signal transmitted by a UE is associated with multipath propagation (e.g., where multiple paths of the signal (e.g., carrying a preamble sequence) arrive at the network entity at different times, resulting in the network entity incorrectly detecting multiple UEs associated with the preamble sequence). Moreover, the time domain techniques do not address how to allocate separate uplink resources to UEs separately (e.g., because all UEs that transmit the same preamble sequence will detect the separate uplink resources and determine that all of the separate uplink resources are intended for that UE). Further, links between a network entity and UEs may be associated with different timing advance offsets. Therefore, when transmitting multiple RAR uplink grants, the network entity may indicate two different timing advance offsets. It may be difficult for a UE to determine which timing advance offset is associated with the UE. Alternatively, the network entity may determine a single timing advance offset value (e.g., an average value from each link or each path) that is suboptimal for each UE.

As indicated above, FIG. 8 is provided as an example. Other examples may differ from what is described with regard to FIG. 8.

Figure 9:
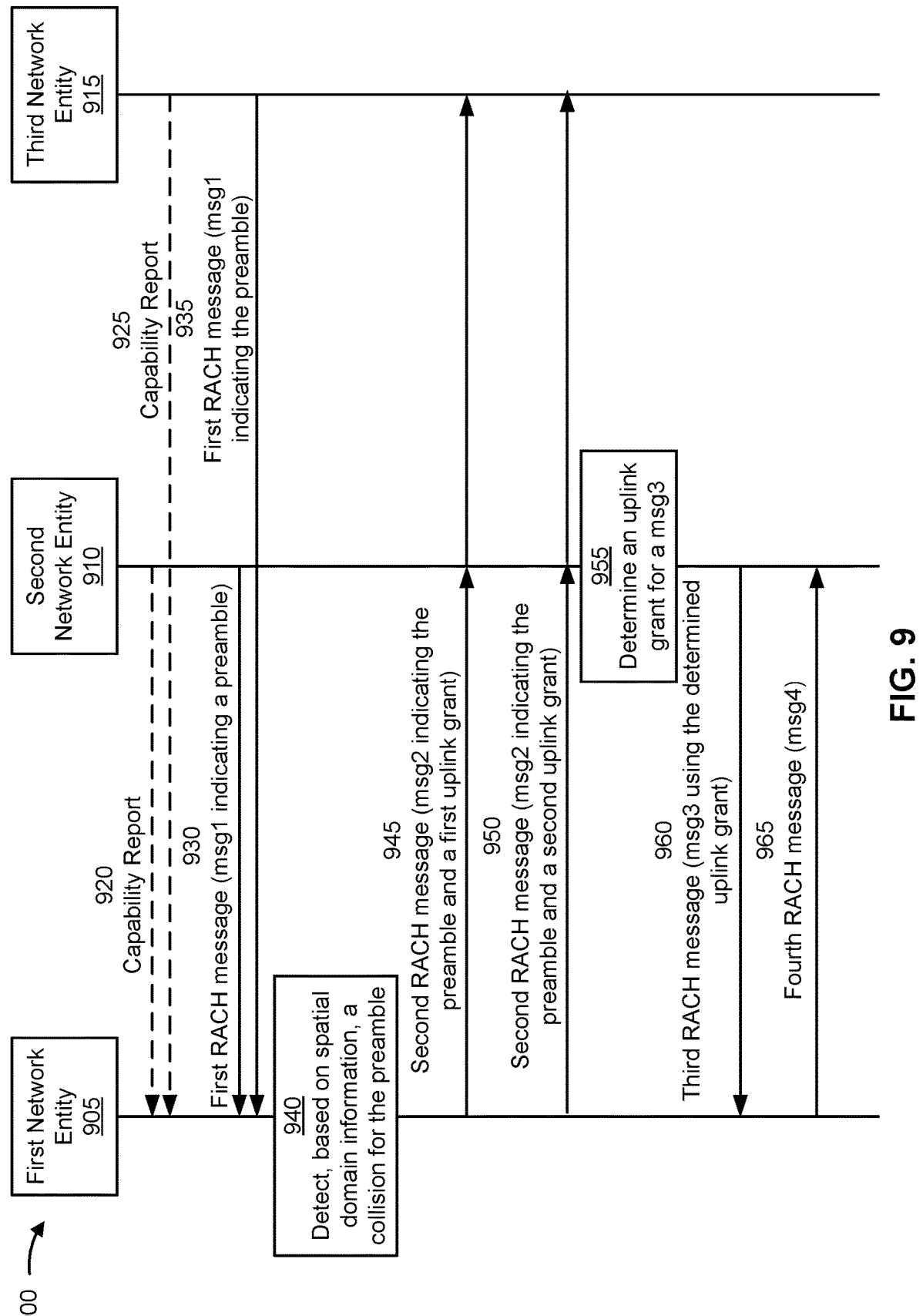
FIG. 9 is a diagram of an example associated with operations associated with spatial domain random access communication handling, in accordance with the present disclosure.

FIG. 9 is a diagram of an example associated with operations 900 associated with spatial domain random access communication handling, in accordance with the present disclosure. As shown in FIG. 9, a first network entity 905, a second network entity 910, and a third network entity 915 may communicate with each other. In some aspects, the first network entity 905, the second network entity 910, and the third network entity 915 may be part of a wireless network (for example, the wireless network 300). The first network entity 905, the second network entity 910, and/or the third network entity 915 may be the network entity 102, the network entity 104, the network entity 106, the apparatus 200, the network node 310, the UE 320, a base station, a CU, a DU, and/or an RU, among other examples. In some aspects, the first network entity 905 may be a network node (e.g., a network node 310, a base station, a CU, a DU, and/or an RU), the second network entity 910 may be a UE (e.g., a UE 320), and the third network entity 915 may be a UE (e.g., a UE 320).

In some aspects, the first network entity 905 may transmit, and the second network entity 910 and/or the third network entity 915 may receive, configuration information. For example, the first network entity 905 may transmit, and the second network entity 910 and/or the third network entity 915 may receive, the configuration information via one or more of system information signaling (e.g., a master information block (MIB) and/or a system information block (SIB), among other examples), radio resource control (RRC) signaling, one or more medium access control (MAC) control elements (MAC-CEs), and/or downlink control information (DCI), among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

In some aspects, the configuration information may indicate that the second network entity 910 and/or the third network entity 915 are to perform one or more operations described herein. In some aspects, the configuration information may be transmitted via system information signaling (e.g., a MIB and/or a SIB). For example, the first network entity 905 may transmit (e.g., broadcast) system information that indicates that network entities (e.g., UEs) that are operating in a cell associated with the first network entity 905 (e.g., a cell served by the first network entity 905) are to perform one or more operations described herein. As another example, the configuration information may be indicated via one or more SSBs and/or random access configuration information. As another example, the configuration information may be indicated via an RRC message and/or a PDCCH order message that triggers a RACH procedure.

For example, the configuration information may indicate that the second network entity 910 and/or the third network entity 915 are to perform one or more spatial domain handling operations for resolving preamble sequence collisions, as described in more detail elsewhere herein. In some aspects, the configuration information may indicate that if a network entity (e.g., the second network entity 910 and/or the third network entity 915) receives multiple RACH communications (e.g., multiple msg2 communications) indicating different uplink grants where each RACH communication indicates an identifier of the same preamble (e.g., the preamble that the network entity transmitted via a msg1 communication), then the network entity is to select a RACH communication from the multiple RACH communications based on measurement information. In other words, the configuration information may indicate that the network entity is to select the RACH communication with a stronger signal (e.g., a stronger measurement).

In some aspects, the configuration information may indicate that a network entity (e.g., the second network entity 910 and/or the third network entity 915) is to continue to monitor for msg2 communications (e.g., for a period of time) after receiving a msg2 communication indicating an identifier of the preamble that the network entity transmitted via a msg1 communication. In other words, the configuration information may indicate that the network entity (e.g., the second network entity 910 and/or the third network entity 915) is to continue monitoring for msg2 communication even after receiving a msg2 communication (e.g., because a msg2 with improved measurement information might be received after the reception of the first msg2 communication, as described in more detail elsewhere herein).

The second network entity 910 and/or the third network entity 915 may configure themselves based at least in part on the configuration information. In some aspects, the second network entity 910 and/or the third network entity 915 may be configured to perform one or more operations described herein based at least in part on the configuration information.

In some aspects, as shown by reference number 920, the second network entity 910 may transmit, and the first network entity 905 may receive, a capability report. Similarly, as shown by reference number 925, the third network entity 915 may transmit, and the first network entity 905 may receive, a capability report. The second network entity 910 and/or the third network entity 915 may transmit the capability report(s) via capability signaling, an RRC communication, a physical uplink shared channel (PUSCH), and/or a physical uplink control channel (PUCCH), among other examples. The capability report(s) may indicate whether the second network entity 910 and/or the third network entity 915 supports a feature and/or one or more parameters related to the feature. The capability report(s) may indicate support for one or more operations described herein. For example, the capability report(s) may indicate a capability and/or parameter for performing spatial domain handling or resolution of preamble sequence collisions, as described in more detail elsewhere herein. As another example, the capability report(s) may indicate a capability and/or parameter for monitoring for msg2 communications after receiving at least one msg2 communication.

One or more operations described herein may be based on capability information of the capability report(s). For example, the second network entity 910 and/or the third network entity 915 may perform a communication in accordance with the capability information, or may receive configuration information that is in accordance with the capability information. In some aspects, the capabilities report may indicate support for selecting an uplink grant for a msg3 from multiple uplink grants indicated by respective RARs (e.g., respective msg2 communications).

The first network entity 905 may configure the second network entity 910 and/or the third network entity 915 in accordance with the capability report(s). For example, the first network entity 905 may configure, or may trigger, the second network entity 910 and/or the third network entity 915 to perform one or more operations based on, in response to, or otherwise associated with the capability report indicating that the second network entity 910 and/or the third network entity 915 support the one or more operations.

In some aspects, the configuration information described herein and/or the capability report(s) may include information transmitted via multiple communications. Additionally, or alternatively, the first network entity 905 may transmit the configuration information, or a communication including at least a portion of the configuration information, before and/or after the second network entity 910 and/or the third network entity 915 transmits the capability report(s). For example, the first network entity 905 may transmit a first portion of the configuration information before the capability report(s), the second network entity 910 and/or the third network entity 915 may transmit at least a portion of the capabilities report, and the first network entity 905 may transmit a second portion of the configuration information after receiving the capability report(s).

Some aspects described herein may be described using terminology associated with a four-step random access procedure (e.g., similar to the procedure described above in connection with FIG. 7). However, the aspects described herein may be similarly applied to any random access procedure (such as a two-step random access procedure). In some aspects, the spatial domain handling of preamble collisions described herein may be beneficial for four-step random access procedures because the RAR (e.g., msg2) in the four-step random access procedure is not accompanied by a communication carrying data (e.g., where the data may indicate the UE or entity to which the data is transmitted), unlike in the step 2 of the two-step random access procedure.

As shown by reference number 930, the second network entity 910 may transmit, and the first network entity 905 may receive, a first RACH communication (e.g., a first random access communication). The first RACH communication may be a RAM. For example, the first RACH communication may be a message 1, msg1, MSG1, a first message, or an initial message (e.g., in a four-step random access procedure). The first random access communication may include a preamble (e.g., a random access preamble). The preamble may be referred to as a random access preamble, a PRACH preamble, and/or a RAM preamble, among other examples. The first random access communication may include a random access preamble identifier (e.g., that is indicative of the preamble).

The transmission of the first RACH communication by the second network entity 910 and/or the reception of the first RACH communication by the first network entity 905 may be associated with first spatial domain information. The spatial domain information may include a spatial direction, a beam, beamforming information, codebook information (e.g., beamforming codebook information), channel estimation information (e.g., of a path associated with a signal carrying the first RACH communication), among other examples. For example, the first network entity 905 may use a first receive beam to receive the first RACH communication. As another example, the first network entity 905 may detect a first path (e.g., associated with a signal carrying the first RACH communication) using non-coherent processing across antennas of the first network entity 905 and estimate a first channel across the antennas for the first path. The estimation of the first channel may be indicative of the first spatial domain information. For example, as described in more detail elsewhere herein, the estimation of the first channel may enable the first network entity 905 to perform spatial nulling for other detected paths to transmit a signal (e.g., a msg2 communication) in a spatial direction associated with the first spatial domain information.

As shown by reference number 935, the third network entity 915 may transmit, and the first network entity 905 may receive, a first RACH communication (e.g., a first random access communication). The first RACH communication may be a RAM. For example, the first RACH communication may be a message 1, msg1, MSG1, a first message, or an initial message (e.g., in a four-step random access procedure). The first random access communication may include the preamble (e.g., the random access preamble). The first random access communication may include the random access preamble identifier (e.g., that is indicative of the preamble).

The transmission of the first RACH communication by the third network entity 915 and/or the reception of the first RACH communication by the first network entity 905 may be associated with second spatial domain information. For example, the first network entity 905 may use a second receive beam to receive the first RACH communication from the third network entity 915. As another example, the first network entity 905 may detect a second path (e.g., associated with a signal carrying the first RACH communication) using the non-coherent processing across antennas of the first network entity 905 and estimate a second channel across the antennas for the second path. The estimation of the second channel may be indicative of the second spatial domain information, as described in more detail elsewhere herein. In other words, because the second network entity 910 and the third network entity 915 may be spatially separated from each other, the signals carrying the msg1 communications may be associated with different spatial domain information (e.g., because the signals originate from different geographic locations or directions with respect to the first network entity 905).

The preambles indicated in the RACH communications (e.g., the msg1 communications) transmitted by the second network entity 910 and the third network entity 915 may be the same preamble (e.g., the same preamble sequence). In some aspects, the second network entity 910 and the third network entity 915 may transmit the RACH communications (e.g., the msg1 communications) using the same (or at least partially overlapping) time domain resources and/or frequency domain resources (e.g., may use the same RACH occasion). As described elsewhere herein, this may be referred to as a preamble collision. For example, the first network entity 905 may receive both msg1 communications at approximately the same time, where both msg1 communications indicate the same preamble.

As shown by reference number 940, the first network entity 905 may detect, based on spatial domain information, a collision for the preamble (e.g., may detect the preamble collision). For example, the first network entity 905 may detect the preamble collision based on, or otherwise associated with, the first spatial domain information (e.g., associated with the msg1 communication transmitted by the second network entity 910) and the second spatial domain information (e.g., associated with the msg1 communication transmitted by the third network entity 915). Detecting the collision for the preamble may include the first network entity 905 determining that multiple (e.g., separate) RARs (e.g., msg2 communications) are to be transmitted in response to receiving the single preamble. In some aspects, detecting the collision for the preamble may include the first network entity 905 determining that multiple (e.g., separate) RARs (e.g., msg2 communications) are to be transmitted in different spatial domain directions (e.g., based on different spatial domain information) in response to receiving the single preamble.

For example, the first network entity 905 may detect the preamble collision based on, or otherwise associated with, a comparison of the first spatial domain information and the second spatial domain information. In some aspects, the first network entity 905 may detect the preamble collision based on, or otherwise associated with, a difference between the first spatial domain information and the second spatial domain information. As an example, the first spatial domain information may indicate a first spatial domain direction and the second spatial domain information may indicate a second spatial domain direction. The difference between the first spatial domain information and the second spatial domain information may be an angle between the first spatial domain direction and the second spatial domain direction. The first network entity 905 may detect the preamble collision based on, or otherwise associated with, the angle satisfying a threshold. In other words, the first network entity 905 may detect the preamble collision based on, or otherwise associated with, signals carrying the respective msg1 communications being sufficiently separated in the spatial domain. The separation in the spatial domain may be indicative of the msg1 communications being transmitted by different network entities (e.g., the second network entity 910 and the third network entity 915).

The first network entity 905 may determine that multiple RARs (e.g., msg2 communications) are to be transmitted for the single preamble based on, in response to, or otherwise associated with detecting the preamble collision. For example, the first network entity 905 may determine that multiple RARs (e.g., msg2 communications) are to be transmitted using different spatial domain information (e.g., using different transmit beams and/or different precoders) based on, in response to, or otherwise associated with detecting the preamble collision. The multiple RARs (e.g., msg2 communications) may indicate respective (e.g., different) resource allocations for a msg3 communication (e.g., may indicate different uplink grants for respective msg3 communications).

For example, the first network entity 905 may determine that a first RAR (e.g., a first msg2) is to be transmitted in response to receiving the indication of the preamble (e.g., the first random access communication from the second network entity 910). The first network entity 905 may determine a first resource allocation (e.g., a first time domain and/or frequency domain resource allocation) associated with the first RAR (e.g., to be indicated via the RAR). The first resource allocation may be an uplink resource allocation (e.g., an uplink grant) for a RAM and/or an RRC connection request message (e.g., a msg3).

The first network entity 905 may determine spatial domain information to be associated with the first RAR (e.g., a first msg2) based on the first spatial domain information (e.g., associated with the msg1 communication transmitted by the second network entity 910). For example, the first spatial domain information may indicate a receive beam used (e.g., by the first network entity 905) to receive the random access communication (e.g., the msg1 transmitted by the second network entity 910). The first network entity 905 may determine that the spatial domain information to be associated with the first RAR (e.g., a first msg2) indicates a transmit beam corresponding to the receive beam. For example, the first network entity 905 may be associated with receive beam and transmit beam correspondence. A transmit beam may "correspond" to a receive beam if the transmit beam and the receive beam are in approximately the same spatial direction (e.g., with respect to the first network entity 905). The first network entity 905 may store beam correspondence information. The beam correspondence information may indicate a transmit beam that corresponds to a given receive beam. The first network entity 905 may determine, using the beam correspondence information and the receive beam used to receive the random access communication (e.g., the msg1 transmitted by the second network entity 910), the transmit beam to be used to transmit the first RAR (e.g., a first msg2).

As another example, the spatial domain information (e.g., to be associated with the first RAR (e.g., a first msg2)) may indicate a precoder that is based on a channel estimate of a channel associated with the first random access communication (e.g., the msg1 transmitted by the second network entity 910) and the first spatial domain information. For example, the first network entity 905 may detect a first path associated with the first random access communication (e.g., the msg1 transmitted by the second network entity 910) and a second path associated with the second random access communication (e.g., the msg1 transmitted by the third network entity 915). The first network entity 905 may estimate a first channel estimate for the first path across one or more antennas of the first network entity 905. The first network entity 905 may estimate a second channel estimate for the second path across the one or more antennas. The first network entity 905 may determine a first precoder (e.g., for a transmission of the first RAR) based on the first channel estimate.

For example, the first network entity 905 may determine nulling information (e.g., spatial nulling information) for the transmission of the first RAR based on the first channel estimate of the first path (e.g., associated with the transmission of the msg1 by the second network entity 910). The nulling information may include precoder information. The precoder information may indicate the first precoder. For example, transmit nulling may be associated with the first network entity 905 applying a precoder to a transmitted signal that results in nulling (e.g., transmitting a null signal) in a certain direction (e.g., on a certain channel). Spatial nulling may be nulling performed in the physical domain to reduce or prevent transmission or reception of a signal in a certain spatial direction. For example, spatial nulling may be achieved by the first network entity 905 selecting which antennas to use to transmit a signal or by physically blocking certain signal directions (e.g., using isolators and/or reflectors, among other examples). The first network entity 905 may select the first precoder (e.g., determine first precoding information) to result in a signal that is in a spatial direction that is based on the first spatial domain information (e.g., associated with the msg1 communication transmitted by the second network entity 910). In some aspects, the first network entity 905 may select one or more antennas to be used to transmit the first RAR based on the first channel estimate of the first path and/or based on the first spatial domain information. The first precoder (e.g., the first precoding information) and/or the selected antennas may result in a signal that nulls (e.g., via spatial nulling and/or transmit nulling) in spatial domain directions other than the spatial domain direction indicated by the first spatial domain information.

The first network entity 905 may determine that a second RAR (e.g., a second msg2) is to be transmitted in response to receiving the indication of the preamble (e.g., the first random access communication from the third network entity 915). The first network entity 905 may determine a second resource allocation (e.g., a second time domain and/or frequency domain resource allocation) associated with the second RAR (e.g., to be indicated via the RAR). The second resource allocation may be an uplink resource allocation (e.g., an uplink grant) for a RAM and/or an RRC connection request message (e.g., a msg3).

The first network entity 905 may determine spatial domain information to be associated with the second RAR (e.g., a second msg2) based on the second spatial domain information (e.g., associated with the msg1 communication transmitted by the third network entity 915). For example, the second spatial domain information may indicate a receive beam used (e.g., by the first network entity 905) to receive the random access communication (e.g., the msg1 transmitted by the third network entity 915). The first network entity 905 may determine that the spatial domain information to be associated with the second RAR (e.g., a second msg2) indicates a transmit beam corresponding to the receive beam. The first network entity 905 may determine, using the beam correspondence information and the receive beam used to receive the random access communication (e.g., the msg1 transmitted by the third network entity 915), the transmit beam to be used to transmit the second RAR (e.g., a second msg2).

As another example, the spatial domain information (e.g., to be associated with the second RAR (e.g., a second msg2)) may indicate a precoder that is based on a channel estimate of a channel associated with the first random access communication (e.g., the msg1 transmitted by the third network entity 915) and the second spatial domain information. For example, the first network entity 905 may detect a second path associated with the second random access communication (e.g., the msg1 transmitted by the third network entity 915). The first network entity 905 may estimate a second channel estimate for the second path across the one or more antennas. The first network entity 905 may determine a second precoder (e.g., for a transmission of the second RAR) based on the second channel estimate.

For example, the first network entity 905 may determine nulling information (e.g., spatial nulling information) for the transmission of the second RAR based on the second channel estimate of the second path (e.g., associated with the transmission of the msg1 by the third network entity 915). The nulling information may include second precoder information. The precoder information may indicate the second precoder. For example, transmit nulling may be associated with the first network entity 905 applying a precoder to a transmitted signal that results in nulling (e.g., transmitting a null signal) in a certain direction (e.g., on a certain channel). The first network entity 905 may select the second precoder (e.g., determine second precoding information) to result in a signal that is in a spatial direction that is based on the second spatial domain information (e.g., associated with the msg1 communication transmitted by the third network entity 915). In some aspects, the first network entity 905 may select one or more antennas to be used to transmit the second RAR based on the second channel estimate of the second path and/or based on the second spatial domain information. The second precoder (e.g., the second precoding information) and/or the selected antennas may result in a signal that nulls (e.g., via spatial nulling and/or transmit nulling) in spatial domain directions other than the spatial domain direction indicated by the second spatial domain information.

As shown by reference number 945, the first network entity 905 may transmit a second RACH message (e.g., a random access communication), such as a msg2. The second RACH message may be (or may include) the first RAR (e.g., the first msg2). The first RAR may include the identifier of the preamble (e.g., the preamble indicated by the msg1 communications from the second network entity 910 and the third network entity 915). The first RAR (e.g., the first msg2) may indicate the first resource allocation (e.g., a first time domain and/or frequency domain resource allocation) for a msg3 communication. The first network entity 905 may transmit the first RAR based on first spatial domain information (e.g., determined by the first network entity 905 as described in more detail elsewhere herein). For example, the first network entity 905 may transmit the first RAR using a first transmit beam (e.g., may beamform the signal to be transmitted in a first spatial domain direction). As another example, the first network entity 905 may transmit the first RAR using a first precoder (e.g., based on first precoding information). As shown in FIG. 9, the second network entity 910 may receive the first RAR (e.g., the first msg2). In some aspects, the third network entity 915 may receive the first RAR (e.g., the first msg2).

As shown by reference number 950, the first network entity 905 may transmit a second RACH message (e.g., a random access communication), such as a msg2. The second RACH message may be (or may include) the second RAR (e.g., the second msg2). The second RAR may include the identifier of the preamble (e.g., the preamble indicated by the msg1 communications from the second network entity 910 and the third network entity 915). The second RAR (e.g., the second msg2) may indicate the second resource allocation (e.g., a second time domain and/or frequency domain resource allocation) for a msg3 communication. The first network entity 905 may transmit the second RAR based on second spatial domain information (e.g., determined by the first network entity 905 as described in more detail elsewhere herein). For example, the first network entity 905 may transmit the second RAR using a second transmit beam (e.g., may beamform the signal to be transmitted in a second spatial domain direction). As another example, the first network entity 905 may transmit the second RAR using a second precoder (e.g., based on second precoding information). As shown in FIG. 9, the third network entity 915 may receive the second RAR (e.g., the second msg2). In some aspects, the second network entity 910 may receive the second RAR (e.g., the second msg2).

For example, in some aspects, a network entity (e.g., the second network entity 910 and/or the third network entity 915) may receive multiple msg2 communications that indicate the identifier of the preamble that the network entity included in a msg1 communication. For example, the network entity (e.g., the second network entity 910 and/or the third network entity 915) may continue to monitor for msg2 communications after receiving an initial msg2 communication (e.g., to ensure that the network entity receives and/or identifies the msg2 communication associated with a strongest signal, as described in more detail elsewhere herein). For example, the second network entity 910 may be configured to monitor, for a period of time after receipt of the second random access communication (e.g., the msg2 communication indicated by reference number 945), for one or more random access communications that include the identifier of the preamble. For example, the second network entity 910 may receive the second RAR (e.g., the msg2, indicated by the reference number 950) after receiving the first RAR (e.g., based on monitoring for random access communications (msg2 communications) for the period of time after the reception of the first RAR).

The period of time for which the second network entity 910 and/or the third network entity 915 continues to monitor for random access communications (msg2 communications) (e.g., after a reception of an initial msg2 communication indicating the identifier of the preamble) may be based on monitoring information. The monitoring information may be indicated via the configuration information and/or may be defined (or otherwise fixed) by a wireless communication standard. For example, the monitoring information may indicate an amount of time (e.g., may define a time window) to be associated with the period of time. In some aspects, the period of time may be based on a timing offset. For example, the timing offset may be an offset between a first time (e.g., a downlink slot) in which a downlink communication for uplink scheduling (e.g., a PDCCH communication, DCI communication, the msg2 communication, or another downlink communication) is received and a second time (e.g., an uplink slot) in which the uplink scheduling indicates an uplink communication is to be transmitted (e.g., on the PUSCH). For example, the timing offset may be a K2 timing offset (e.g., as defined, or otherwise fixed, by a wireless communication standard, such as the 3GPP). The period of time may be based on the K2 timing offset (e.g., may be the K2 timing offset or may be a portion of the K2 timing offset).

In some aspects, the period of time during which the second network entity 910 and/or the third network entity 915 are configured to monitor for msg2 communications may extend beyond a time of a msg3 transmission. For example, the second network entity 910 and/or the third network entity 915 may receive, based on monitoring for the one or more random access communications, a msg2 communication after transmission of a msg3 communication. This may result in the second network entity 910 and/or the third network entity 915 transmitting multiple msg3 communications, as described in more detail elsewhere herein.

As shown by reference number 955, the second network entity 910 may determine an uplink grant (e.g., a particular resource allocation) to be used for a msg3 communication. The third network entity 915 may determine an uplink grant (e.g., a particular resource allocation) to be used for a msg3 communication in a similar manner as described herein in connection with the second network entity 910. For example, the second network entity 910 may determine an uplink grant (e.g., a particular resource allocation) to be used for a msg3 communication based on measurement information of respective msg2 communications received by the second network entity 910 (e.g., where the msg2 communication indicates the identifier of the preamble).

For example, the second network entity 910 may determine a particular resource allocation and/or particular spatial domain information to be associated with the msg3 communication based on first measurement information associated with the first RAR (e.g., the first msg2, shown by reference number 945) and second measurement information associated with the second RAR (e.g., the second msg2, shown by reference number 950). The first measurement information may include a first value (e.g., a first measure-ment value) and the second measurement information may include a second value (e.g., a second measurement value). The first measurement information may include a first signal strength measurement and the second measurement information may include a second signal strength measurement. For example, the first value and the second value may be values of a measurement parameter. The measurement parameter may be an RSRP parameter, a signal-to-interference-plus-noise ratio (SINR) parameter, an RSSI parameter, and/or an RSRQ, among other examples. The second network entity 910 may determine the particular resource allocation (e.g., either the first resource allocation indicated by the first RAR or the second resource allocation indicated by the second RAR) based on the first value and the second value. For example, if the first value is greater than the second value, then the second network entity 910 may determine that the particular resource allocation is the first resource allocation indicated by the first RAR. If the second value is greater than the first value, then the second network entity 910 may determine that the particular resource allocation is the second resource allocation indicated by the second RAR.

For example, the RAR (e.g., the msg2 communication) associated with a stronger signal (e.g., as received by the second network entity 910) may have a higher likelihood of being intended for the second network entity 910. For example, because the first network entity 905 determines spatial domain information for the RAR (e.g., the msg2 communication) using spatial domain information of the msg1 communication transmitted by the second network entity 910, the RAR (e.g., the msg2 communication) associated with a stronger signal may be transmitted in a spatial direction toward the second network entity 910 (e.g., thereby indicating that the RAR is intended for the second network entity 910). Therefore, when the second network entity 910 receives multiple msg2 communications, the second network entity 910 may use information (e.g., an uplink resource allocation) from a msg2 communication (e.g., from the multiple msg2 communications) that is associated with a signal having the best measurement information (e.g., a highest signal strength measurement).

In some aspects, the second network entity 910 may determine particular spatial domain information for the msg3 communication based on the spatial domain information of the msg2 that is associated with the best measurement information (e.g., a highest signal strength measurement). For example, as described above, the second network entity 910 may determine a msg2 communication (e.g., from multiple received msg2 communications) intended for the second network entity 910 based on measurement information of respective msg2 communications. The second network entity 910 may determine spatial domain information (e.g., a transmit beam, a spatial direction, and/or a precoder) based on spatial domain information associated with the determined msg2 communication (e.g., in a similar manner as the first network entity 905 determines spatial domain information for the msg2 communications, as described in more detail elsewhere herein).

As shown by reference number 960, the second network entity 910 may transmit a third RACH message (e.g., a random access communication). The third RACH message may be a msg3 communication. For example, the msg3 communication may be an RRC connection request message, a message 3, a MSG3, and/or a third message of a four-step random access procedure. In some aspects, the msg3 communication may include a UE identifier, UCI, and/or a PUSCH communication (e.g., an RRC connection request), among other examples. The second network entity 910 may transmit the msg3 communication using the determined uplink grant (e.g., the uplink resource allocation). For example, the second network entity 910 may transmit the msg3 communication using time domain and/or frequency domain resources indicated by the msg2 communication that is associated with the highest signal strength (e.g., as received by the second network entity 910). In some aspects, the second network entity 910 may transmit the msg3 communication based on particular spatial domain information (e.g., using a transmit beam, a given spatial domain direction, and/or a precoder) that is based on the spatial domain information of the msg2 communication that is associated with the highest signal strength (e.g., as received by the second network entity 910). The third network entity 915 may transmit a different msg3 communication (e.g., using a different uplink resource allocation indicated by another msg2 communication) in a similar manner.

In some aspects, the second network entity 910 may receive another msg2 communication after the transmission of the msg3 communication. For example, as described elsewhere herein, the second network entity 910 may be configured to continue to monitor for msg2 communications after the transmission of the msg3 communication. As described above, the msg3 communication may be a resource allocation indicated by a first msg2 communication. The first msg2 communication may be associated with first measurement information (e.g., including a first value). The msg2 communication after the transmission of the msg3 communication (e.g., a second msg2 communication) may be associated with second measurement information (e.g., including a second value). In some aspects, the second value may be greater than the first value (e.g., indicating that the second msg2 communication is associated with a stronger signal strength than the first msg2 communication). In such examples, the second network entity 910 may transmit a second msg3 communication using an uplink resource allocation indicated by the second msg2 communication. In some aspects, the second network entity 910 may transmit the second msg3 communication based on a difference between the second value and the first value satisfying a threshold. This may ensure that the second network entity 910 is using the uplink resource allocation (e.g., for a msg3) that is associated with the spatial direction toward the second network entity 910 (e.g., with respect to the first network entity 905). This enables the first network entity 905 to determine communication parameters for a connection between the first network entity 905 and the second network entity 910 that improve communication performance of the second network entity 910 (e.g., because the first network entity 905 may determine the communication parameters using information from the msg3 that is in the spatial direction toward the second network entity 910).

As shown by reference number 965, the first network entity 905 may transmit, and the second network entity 910 may receive, a fourth RACH message (e.g., a random access communication), such as a msg4. The msg4 may be, or may include, an RRC connection setup message. The msg4 may be referred to as message 4, MSG4, or a fourth message of a four-step random access procedure. In some aspects, the RRC connection setup message may include a detected (UE) identifier, a timing advance value, and/or contention resolution information. The information indicated in the msg4 may be based on the msg3 transmitted by the second network entity 910. If the second network entity 910 successfully receives the RRC connection setup message, then the second network entity 910 may transmit a HARQ ACK.

This enables the first network entity 905 and the second network entity 910 to establish an RRC connection. The first network entity 905 and the third network entity 915 may establish an RRC connection in a similar manner (e.g., based on a different msg3 transmitted by the third network entity 915). As indicated above, FIG. 9 is provided as an example. Other examples may differ from what is described with respect to FIG. 9.

FIG. 10 is a diagram of an example 1000 associated with spatial domain random access communication handling, in accordance with the present disclosure. As shown in FIG. 10, a first network entity 1005 (e.g., a base station, a network node, a CU, a DU, and/or an RU), a second network entity 1010 (e.g., a UE), and a third network entity 1015 (e.g., a UE) may communicate with each other.

For example, the second network entity 1010 may transmit a msg1 1020. The msg1 1020 may include a preamble (e.g., a preamble sequence). The third network entity 1015 may transmit a msg1 1025. The msg1 1025 may include the preamble (e.g., the same preamble as the msg1 1020). For example, the msg1 1020 and the msg1 1025 may be associated with the same radio resource allocation and the same random access preamble.

The first network entity 1005 may detect and/or determine that there are multiple network entities attempting to use the same preamble based on spatial domain information. For example, the first network entity 1005 may determine that the msg1 1020 and the msg1 1025 are associated with different spatial domain information (e.g., as shown in FIG. 10, the msg1 1020 and the msg1 1025 may originate from different locations). Based on determining that there are multiple network entities attempting to use the same preamble (e.g., based on spatial domain information), the first network entity 1005 may determine that multiple msg2 communications are to be transmitted that indicate the same preamble identifier. For example, the spatial domain information of the msg1 1020 and the msg1 1025 may enable the first network entity 1005 to distinguish between the msg1 1020 transmitted by the second network entity 1010 and the msg1 1025 transmitted by the third network entity 1015.

The first network entity 1005 may transmit a first msg2 1030. As shown in FIG. 10, the first msg2 1030 may be transmitted in a spatial direction toward the second network entity 1010. For example, as described in more detail elsewhere herein, the first network entity 1005 may determine spatial domain information for the first msg2 1030 based on spatial domain information associated with the msg1 1020. This may result in the first network entity 1005 transmitting the first msg2 1030 in the spatial direction toward the second network entity 1010. This improves a likelihood that the second network entity 1010 is able to successfully receive the first msg2 1030 and/or improves a performance of the first msg2 1030.

The first network entity 1005 may transmit a second msg2 1035. As shown in FIG. 10, the second msg2 1035 may be transmitted in a spatial direction toward the third network entity 1015. For example, as described in more detail elsewhere herein, the first network entity 1005 may determine spatial domain information for the second msg2 1035 based on spatial domain information associated with the msg1 1025. This may result in the first network entity 1005 transmitting the second msg2 1035 in the spatial direction toward the third network entity 1015. This improves a likelihood that the third network entity 1015 is able to successfully receive the second msg2 1035 and/or improves a performance of second msg2 1035.

As a result, the first network entity 1005 may be config- ured to resolve a preamble sequence collision (e.g., where multiple network entities or UEs transmit a msg1 including the same preamble and using the same RACH occasion) using spatial domain information. This reduces a latency associated with the multiple network entities or UEs estab- lishing a network connection (e.g., by reducing a likelihood of a failure of the RACH procedure that would have other- wise been caused by the preamble sequence collision). Additionally, this conserves network resources, processing resources, memory resources, and/or power resources that would have otherwise been used in association with per- forming additional random access procedures due to a RACH failure caused by the preamble sequence collision.

As indicated above, FIG. 10 is provided as an example. Other examples may differ from what is described with respect to FIG. 10.

FIG. 11 is a diagram illustrating an example process 1100 performed, for example, at a first network entity or an apparatus of a first network entity, in accordance with the present disclosure. Example process 1100 is an example where the apparatus or the first network entity (e.g., a UE 320, the network entity 102, the network entity 106, the apparatus 200, the network entity 404, the second network entity 910, the third network entity 915, the second network entity 1010, and/or the third network entity 1015) performs operations associated with spatial domain random access communication handling.

As shown in FIG. 11, in some aspects, process 1100 may include transmitting, to a second network entity, a first random access communication, wherein the first random access communication includes a random access preamble (block 1110). For example, the first network entity (e.g., using communication manager 1308 and/or transmission component 1304, depicted in FIG. 13) may transmit, to a second network entity, a first random access communication, wherein the first random access communication includes a random access preamble, as described above. In some aspects, the first random access communication may be a msg1 communication.

As further shown in FIG. 11, in some aspects, process 1100 may include receiving, from the second network entity, a second random access communication including an iden- tifier indicative of the random access preamble, wherein the second random access communication indicates a first resource allocation, and wherein the second random access communication is associated with first spatial domain infor- mation (block 1120). For example, the first network entity (e.g., using communication manager 1308 and/or reception component 1302, depicted in FIG. 13) may receive, from the second network entity, a second random access communi- cation including an identifier indicative of the random access preamble, wherein the second random access communica- tion indicates a first resource allocation, and wherein the second random access communication is associated with first spatial domain information, as described above. In some aspects, the second random access communication may be a msg2 communication.

As further shown in FIG. 11, in some aspects, process 1100 may include receiving, from the second network entity, a third random access communication including the identi- fier, wherein the third random access communication indi- cates a second resource allocation, and wherein the third random access communication is associated with second spatial domain information (block 1130). For example, the first network entity (e.g., using communication manager 1308 and/or reception component 1302, depicted in FIG. 13)

may receive, from the second network entity, a third random access communication including the identifier, wherein the third random access communication indicates a second resource allocation, and wherein the third random access communication is associated with second spatial domain information, as described above. In some aspects, the third random access communication may be a msg2 communica- tion.

As further shown in FIG. 11, in some aspects, process 1100 may include transmitting, to the second network entity, a fourth random access communication via a particular resource allocation, wherein the particular resource is either the first resource allocation or the second resource alloca- tion, and wherein the fourth random access communication is based on particular spatial domain information, wherein the particular spatial domain information is based on either the first spatial domain information or the second spatial domain information (block 1140). For example, the first network entity (e.g., using communication manager 1308 and/or transmission component 1304, depicted in FIG. 13) may transmit, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain informa- tion, as described above. In some aspects, the fourth random access communication may be a msg3 communication.

Process 1100 may include additional aspects, such as any single aspect or any combination of aspects described below and/or in connection with one or more other processes described elsewhere herein.

In a first aspect, process 1100 includes determining the particular resource allocation and the particular spatial domain information based on first measurement information associated with the second random access communication and second measurement information associated with the third random access communication.

In a second aspect, alone or in combination with the first aspect, the first measurement information includes a first value and the second measurement information includes a second value, and wherein, based on the first value being greater than the second value, the particular resource allo- cation is the first resource allocation, and wherein, based on the first value being greater than the second value, the particular spatial domain information is based on the first spatial domain information.

In a third aspect, alone or in combination with one or more of the first and second aspects, the first measurement infor- mation includes a first signal strength measurement and the second measurement information includes a second signal strength measurement.

In a fourth aspect, alone or in combination with one or more of the first through third aspects, process 1100 includes monitoring, for a period of time after receipt of the second random access communication, for one or more random access communications that include the identifier; and receiving the third random access communication based on monitoring for the one or more random access communica- tions.

In a fifth aspect, alone or in combination with one or more of the first through fourth aspects, transmitting the fourth random access communication includes transmitting, after the period of time, the fourth random access communication.

In a sixth aspect, alone or in combination with one or more of the first through fifth aspects, the period of time is based on a time offset between downlink scheduling and an uplink communication scheduled by the downlink scheduling.

In a seventh aspect, alone or in combination with one or more of the first through sixth aspects, the particular resource allocation is the first resource allocation and the particular spatial domain information is based on the first spatial domain information, and transmitting the fourth random access communication includes transmitting, based on receipt of the second random access communication, the fourth random access communication, and monitoring for one or more random access communications that include the identifier for a period of time after transmission of the fourth random access communication.

In an eighth aspect, alone or in combination with one or more of the first through seventh aspects, receiving the third random access communication includes receiving, based on monitoring for the one or more random access communications, the third random access communication after transmission of the fourth random access communication.

In a ninth aspect, alone or in combination with one or more of the first through eighth aspects, the second random access communication is associated with first measurement information indicating a first value, wherein the third random access communication is associated with second measurement information indicating a second value, and process 1100 includes transmitting, to the second network entity and based on the second value being greater than the first value, a fifth random access message, wherein the fifth random access message uses the second resource allocation based on the second value being greater than the first value, and wherein the fifth random access message uses spatial domain information that is based on the second spatial domain information based on the second value being greater than the first value.

In a tenth aspect, alone or in combination with one or more of the first through ninth aspects, the first spatial domain information includes first beam information and the second spatial domain information includes second beam information.

In an eleventh aspect, alone or in combination with one or more of the first through tenth aspects, the first spatial domain information includes first precoder information and the second spatial domain information includes second precoder information.

In a twelfth aspect, alone or in combination with one or more of the first through eleventh aspects, the second random access communication and the third random access communication are each a respective random access response communication.

In a thirteenth aspect, alone or in combination with one or more of the first through twelfth aspects, the first random access communication is a random access message.

In a fourteenth aspect, alone or in combination with one or more of the first through thirteenth aspects, the fourth random access communication is a radio resource control connection request message.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, at a first network entity or an apparatus of a first network entity, in accordance with the present disclosure. Example process 1200 is an example where the apparatus or the first network entity (e.g., the network node 310, the network entity 102, the network entity 106, the apparatus 200, the network entity 404, the first network entity 905, and/or the first network entity 1005) performs operations associated with spatial domain random access communication handling.

As shown in FIG. 12, in some aspects, process 1200 may include receiving a first random access communication, wherein the first random access communication includes a random access preamble, and wherein the first random access communication is associated with first spatial domain information (block 1210). For example, the first network entity (e.g., using communication manager 1408 and/or reception component 1402, depicted in FIG. 14) may receive a first random access communication, wherein the first random access communication includes a random access preamble, and wherein the first random access communication is associated with first spatial domain information, as described above. In some aspects, the first random access communication may be a msg1 communication.

As further shown in FIG. 12, in some aspects, process 1200 may include receiving a second random access communication, wherein the second random access communication includes the random access preamble, and wherein the second random access communication is associated with second spatial domain information (block 1220). For example, the first network entity (e.g., using communication manager 1408 and/or reception component 1402, depicted in FIG. 14) may receive a second random access communication, wherein the second random access communication includes the random access preamble, and wherein the second random access communication is associated with second spatial domain information, as described above. In some aspects, the second random access communication may be a msg1 communication.

As further shown in FIG. 12, in some aspects, process 1200 may include transmitting, based on the first random access communication being associated with the first spatial domain information, a third random access communication indicating an identifier of the random access preamble and a first resource allocation for an uplink random access communication (block 1230). For example, the first network entity (e.g., using communication manager 1408 and/or transmission component 1404, depicted in FIG. 14) may transmit, based on the first random access communication being associated with the first spatial domain information, a third random access communication indicating an identifier of the random access preamble and a first resource allocation for an uplink random access communication, as described above. In some aspects, the third random access communication may be a msg2 communication.

As further shown in FIG. 12, in some aspects, process 1200 may include transmitting, based on the second random access communication being associated with the second spatial domain information, a fourth random access communication indicating the identifier and a second resource allocation for the uplink random access communication (block 1240). For example, the first network entity (e.g., using communication manager 1408 and/or transmission component 1404, depicted in FIG. 14) may transmit, based on the second random access communication being associated with the second spatial domain information, a fourth random access communication indicating the identifier and a second resource allocation for the uplink random access communication, as described above. In some aspects, the fourth random access communication may be a msg2 communication.

Process 1200 may include additional aspects, such as any single aspect or any combination of aspects described below and/or in connection with one or more other processes described elsewhere herein.

In a first aspect, transmitting the third random access communication includes transmitting the third random access communication using spatial domain information that is based on the first spatial domain information.

In a second aspect, alone or in combination with the first aspect, the first spatial domain information indicates a receive beam used to receive the first random access communication, and the spatial domain information indicates a transmit beam corresponding to the receive beam.

In a third aspect, alone or in combination with one or more of the first and second aspects, the spatial domain information indicates a precoder that is based on a channel estimate of a channel associated with the first random access communication and the first spatial domain information.

In a fourth aspect, alone or in combination with one or more of the first through third aspects, transmitting the fourth random access communication includes transmitting the fourth random access communication using spatial domain information that is based on the second spatial domain information.

In a fifth aspect, alone or in combination with one or more of the first through fourth aspects, the second spatial domain information indicates a receive beam used to receive the second random access communication, and the spatial domain information indicates a transmit beam corresponding to the receive beam.

In a sixth aspect, alone or in combination with one or more of the first through fifth aspects, the spatial domain information indicates a precoder that is based on a channel estimate of a channel associated with the second random access communication and the second spatial domain information.

In a seventh aspect, alone or in combination with one or more of the first through sixth aspects, process 1200 includes determining that the third random access communication and the fourth random access communication are to be transmitted based on a difference between the first spatial domain information and the second spatial domain information.

In an eighth aspect, alone or in combination with one or more of the first through seventh aspects, the first spatial domain information indicates a first spatial domain direction, the second spatial domain information indicates a second spatial domain direction, the difference is an angle between the first spatial domain direction and the second spatial domain direction, and determining that the third random access communication and the fourth random access communication are to be transmitted is based on the angle satisfying a threshold.

In a ninth aspect, alone or in combination with one or more of the first through eighth aspects, process 1200 includes detecting a first path associated with the first random access communication and a second path associated with the second random access communication, estimating a first channel estimate for the first path across one or more antennas of the first network entity, and estimating a second channel estimate for the second path across the one or more antennas, wherein the third random access communication is associated with a first precoder that is based on the first channel estimate and the fourth random access communication is associated with a second precoder that is based on the second channel estimate.

In a tenth aspect, alone or in combination with one or more of the first through ninth aspects, process 1200 includes receiving, via the first resource allocation, a fifth random access communication associated with a second network entity, receiving, via the second resource allocation, a sixth random access communication associated with a third network entity, establishing a first connection with the second network entity based on receiving the fifth random access communication, and establishing a second connection with the third network entity based on receiving the sixth random access communication.

In an eleventh aspect, alone or in combination with one or more of the first through tenth aspects, the first random access communication and the second random access communication are associated with a same radio resource allocation that is associated with the random access preamble.

In a twelfth aspect, alone or in combination with one or more of the first through eleventh aspects, the first random access communication and the second random access communication are random access messages.

In a thirteenth aspect, alone or in combination with one or more of the first through twelfth aspects, the third random access communication and the fourth random access communication are random access response communications.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
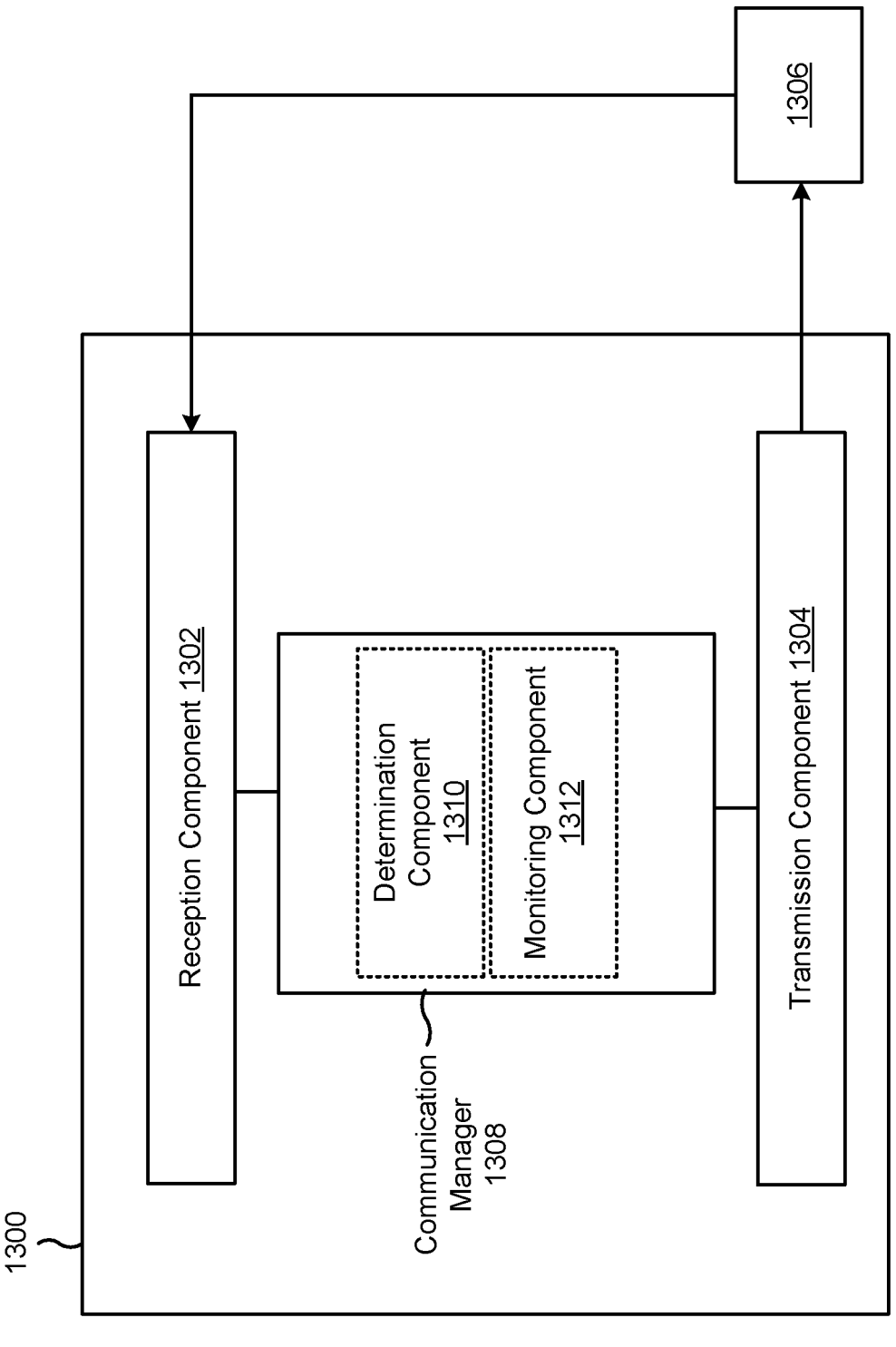
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network entity, or a network entity may include the apparatus 1300. In some aspects, apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may be, or may be similar to, one or more other communication managers described herein. The communication manager 1308 may include one or more of a determination component 1310, and/or a monitoring component 1312, among other examples.

In some aspects, the apparatus 1300 may be configured to perform one or more operations described herein in connection with FIGS. 9 and 10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the network entity described in connection with FIG. 2 and/or FIG. 4. Additionally, or alternatively, one or more components shown in FIG. 13 may be implemented within one or more components described in connection with FIG. 2 and/or FIG. 4. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the network entity described in connection with FIG. 2 and/or FIG. 4.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, one or more modems, one or more modulators, one or more transmit MIMO processors, one or more transmit processors, one or more controllers/processors, one or more memories, or a combination thereof, of the network entity described in connection with FIG. 2 and/or FIG. 4. In some aspects, the transmission component 1304 may be co-located with the reception component 1302 in one or more transceivers.

The transmission component 1304 may transmit, to a second network entity, a first random access communication, wherein the first random access communication includes a random access preamble. The reception component 1302 may receive, from the second network entity, a second random access communication including an identifier indicative of the random access preamble, wherein the second random access communication indicates a first resource allocation, and wherein the second random access communication is associated with first spatial domain information. The reception component 1302 may receive, from the second network entity, a third random access communication including the identifier, wherein the third random access communication indicates a second resource allocation, and wherein the third random access communication is associated with second spatial domain information. The transmission component 1304 may transmit, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information.

The determination component 1310 may determine the particular resource allocation and the particular spatial domain information based on first measurement information associated with the second random access communication and second measurement information associated with the third random access communication.

The monitoring component 1312 may monitor, for a period of time after receipt of the second random access communication, for one or more random access communications that include the identifier, wherein receiving the third random access communication is based on monitoring for the one or more random access communications.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
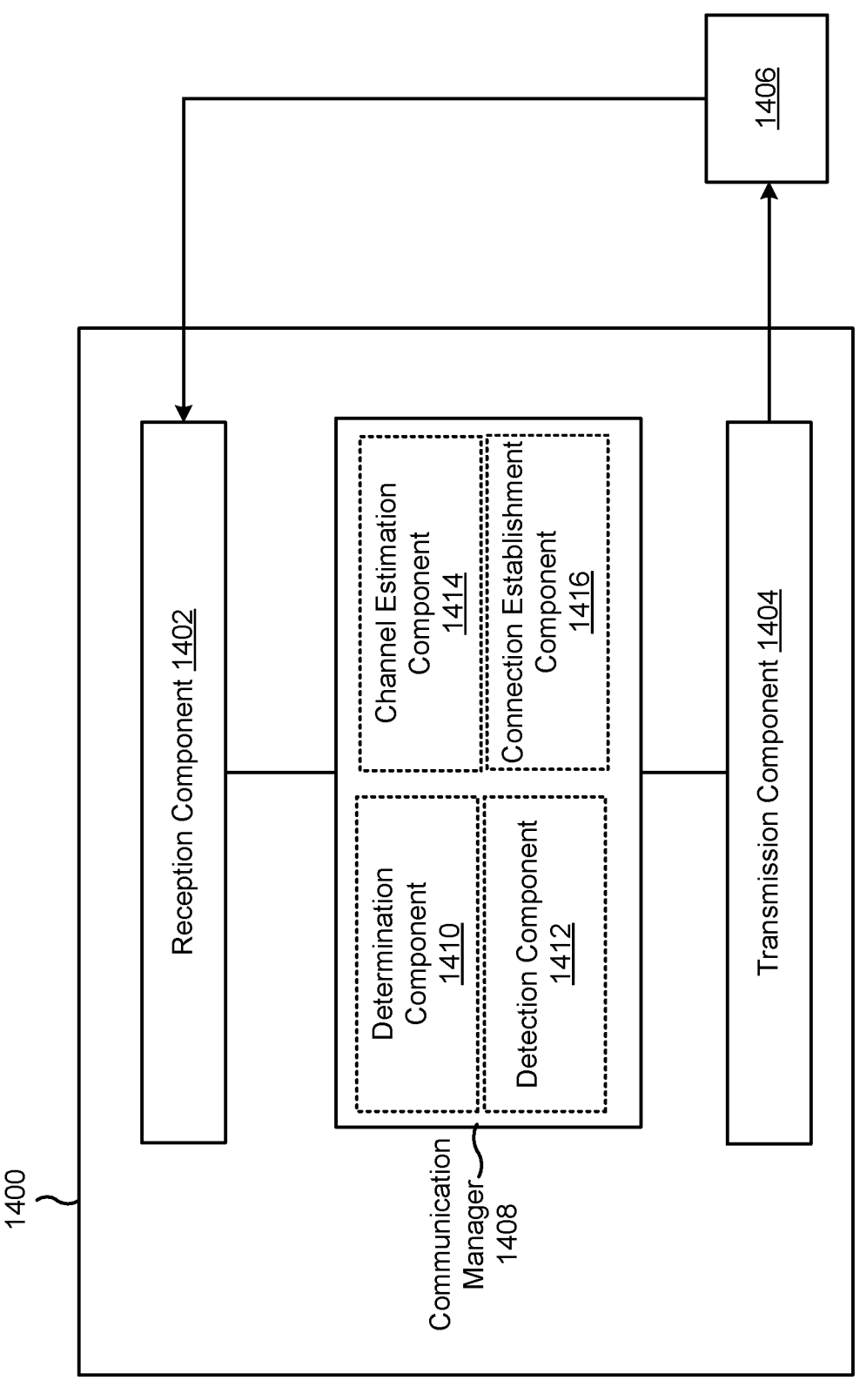
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network entity, or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may be, or may be similar to, one or more other communication managers described herein. The communication manager 1408 may include one or more of a determination component 1410, a detection component 1412, a channel estimation component 1414, and/or a connection establishment component 1416, among other examples.

In some aspects, the apparatus 1400 may be configured to perform one or more operations described herein in connection with FIGS. 9 and 10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the network entity described in connection with FIG. 2 and/or FIG. 4. Additionally, or alternatively, one or more components shown in FIG. 14 may be implemented within one or more components described in connection with FIG. 2 and/or FIG. 4. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more MIMO detectors, one or more receive processors, one or more controllers/processors, one or more memories, or a combination thereof, of the network entity described in connection with FIG. 2 and/or FIG. 4.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, one or more modems, one or more modulators, one or more transmit MIMO processors, one or more transmit processors, one or more controllers/processors, one or more memories, or a combination thereof, of the network entity described in connection with FIG. 2 and/or FIG. 4. In some aspects, the transmission component 1404 may be co-located with the reception component 1402 in one or more transceivers.

The reception component 1402 may receive a first random access communication, wherein the first random access communication includes a random access preamble, and wherein the first random access communication is associated with first spatial domain information. The reception component 1402 may receive a second random access communication, wherein the second random access communication includes the random access preamble, and wherein the second random access communication is associated with second spatial domain information. The transmission component 1404 may transmit, based on the first random access communication being associated with the first spatial domain information, a third random access communication indicating an identifier of the random access preamble and a first resource allocation for an uplink random access communication. The transmission component 1404 may transmit, based on the second random access communication being associated with the second spatial domain information, a fourth random access communication indicating the identifier and a second resource allocation for the uplink random access communication.

The determination component 1410 may determine that the third random access communication and the fourth random access communication are to be transmitted based on a difference between the first spatial domain information and the second spatial domain information.

The detection component 1412 may detect a first path associated with the first random access communication and a second path associated with the second random access communication.

The channel estimation component 1414 may estimate a first channel estimate for the first path across one or more antennas of the first network entity.

The channel estimation component 1414 may estimate a second channel estimate for the second path across the one or more antennas, wherein the third random access communication is associated with a first precoder that is based on the first channel estimate and the fourth random access communication is associated with a second precoder that is based on the second channel estimate.

The reception component 1402 may receive, via the first resource allocation, a fifth random access communication associated with a second network entity.

The reception component 1402 may receive, via the second resource allocation, a sixth random access communication associated with a third network entity.

The connection establishment component 1416 may establish a first connection with the second network entity based on receiving the fifth random access communication.

The connection establishment component 1416 may establish a second connection with the third network entity based on receiving the sixth random access communication.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first network entity, comprising: transmitting, to a second network entity, a first random access communication, wherein the first random access communication includes a random access preamble; receiving, from the second network entity, a second random access communication including an identifier indicative of the random access preamble, wherein the second random access communication indicates a first resource allocation, and wherein the second random access communication is associated with first spatial domain information; receiving, from the second network entity, a third random access communication including the identifier, wherein the third random access communication indicates a second resource allocation, and wherein the third random access communication is associated with second spatial domain information; and transmitting, to the second network entity, a fourth random access communication via a particular resource allocation, wherein the particular resource is either the first resource allocation or the second resource allocation, and wherein the fourth random access communication is based on particular spatial domain information, wherein the particular spatial domain information is based on either the first spatial domain information or the second spatial domain information.

Aspect 2: The method of Aspect 1, further comprising: determining the particular resource allocation and the particular spatial domain information based on first measurement information associated with the second random access communication and second measurement information associated with the third random access communication.

Aspect 3: The method of Aspect 2, wherein the first measurement information includes a first value and the second measurement information includes a second value, and wherein, based on the first value being greater than the second value, the particular resource allocation is the first resource allocation, and wherein, based on the first value being greater than the second value, the particular spatial domain information is based on the first spatial domain information.

Aspect 4: The method of any of Aspects 2-3, wherein the first measurement information includes a first signal strength measurement and the second measurement information includes a second signal strength measurement.

Aspect 5: The method of any of Aspects 1-4, further comprising: monitoring, for a period of time after receipt of the second random access communication, for one or more random access communications that include the identifier, wherein receiving the third random access communication is based on monitoring for the one or more random access communications.

Aspect 6: The method of Aspect 5, wherein transmitting the fourth random access communication comprises: transmitting, after the period of time, the fourth random access communication.

Aspect 7: The method of any of Aspects 5-6, wherein the period of time is based on a time offset between downlink scheduling and an uplink communication scheduled by the downlink scheduling.

Aspect 8: The method of any of Aspects 1-7, wherein the particular resource allocation is the first resource allocation and the particular spatial domain information is based on the first spatial domain information, and wherein transmitting the fourth random access communication comprises: transmitting, based on receipt of the second random access communication, the fourth random access communication; and monitoring for one or more random access communications that include the identifier for a period of time after transmission of the fourth random access communication.

Aspect 9: The method of Aspect 8, wherein receiving the third random access communication comprises: receiving, based on monitoring for the one or more random access communications, the third random access communication after transmission of the fourth random access communication.

Aspect 10: The method of Aspect 9, wherein the second random access communication is associated with first measurement information indicating a first value, wherein the third random access communication is associated with second measurement information indicating a second value, and the method further comprising: transmitting, to the second network entity and based on the second value being greater than the first value, a fifth random access message, wherein the fifth random access message uses the second resource allocation based on the second value being greater than the first value, and wherein the fifth random access message uses spatial domain information that is based on the second spatial domain information based on the second value being greater than the first value.

Aspect 11: The method of any of Aspects 1-10, wherein the first spatial domain information includes first beam information and the second spatial domain information includes second beam information.

Aspect 12: The method of any of Aspects 1-11, wherein the first spatial domain information includes first precoder information and the second spatial domain information includes second precoder information.

Aspect 13: The method of any of Aspects 1-12, wherein the second random access communication and the third random access communication are each a respective random access response communication.

Aspect 14: The method of any of Aspects 1-13, wherein the first random access communication is a random access message.

Aspect 15: The method of any of Aspects 1-14, wherein the fourth random access communication is a radio resource control connection request message.

Aspect 16: A method of wireless communication performed by a first network entity, comprising: receiving a first random access communication, wherein the first random access communication includes a random access preamble, and wherein the first random access communication is associated with first spatial domain information; receiving a second random access communication, wherein the second random access communication includes the random access preamble, and wherein the second random access communication is associated with second spatial domain information; transmitting, based on the first random access communication being associated with the first spatial domain information, a third random access communication indicating an identifier of the random access preamble and a first resource allocation for an uplink random access communication; and transmitting, based on the second random access communication being associated with the second spatial domain information, a fourth random access communication indicating the identifier and a second resource allocation for the uplink random access communication.

Aspect 17: The method of Aspect 16, wherein transmitting the third random access communication comprises: transmitting the third random access communication using spatial domain information that is based on the first spatial domain information.

Aspect 18: The method of Aspect 17, wherein the first spatial domain information indicates a receive beam used to receive the first random access communication, and wherein the spatial domain information indicates a transmit beam corresponding to the receive beam.

Aspect 19: The method of any of Aspects 17-18, wherein the spatial domain information indicates a precoder that is based on a channel estimate of a channel associated with the first random access communication and the first spatial domain information.

Aspect 20: The method of any of Aspects 16-19, wherein transmitting the fourth random access communication comprises: transmitting the fourth random access communication using spatial domain information that is based on the second spatial domain information.

Aspect 21: The method of Aspect 20, wherein the second spatial domain information indicates a receive beam used to receive the second random access communication, and wherein the spatial domain information indicates a transmit beam corresponding to the receive beam.

Aspect 22: The method of any of Aspects 20-21, wherein the spatial domain information indicates a precoder that is based on a channel estimate of a channel associated with the second random access communication and the second spatial domain information.

Aspect 23: The method of any of Aspects 16-22, further comprising: determining that the third random access communication and the fourth random access communication are to be transmitted based on a difference between the first spatial domain information and the second spatial domain information.

Aspect 24: The method of Aspect 23, wherein the first spatial domain information indicates a first spatial domain direction, wherein the second spatial domain information indicates a second spatial domain direction, and wherein the difference is an angle between the first spatial domain direction and the second spatial domain direction, and wherein determining that the third random access communication and the fourth random access communication are to be transmitted is based on the angle satisfying a threshold.

Aspect 25: The method of any of Aspects 16-24, further comprising: detecting a first path associated with the first random access communication and a second path associated with the second random access communication; estimating a first channel estimate for the first path across one or more antennas of the first network entity; and estimating a second channel estimate for the second path across the one or more antennas, wherein the third random access communication is associated with a first precoder that is based on the first channel estimate and the fourth random access communication is associated with a second precoder that is based on the second channel estimate.

Aspect 26: The method of any of Aspects 16-25, further comprising: receiving, via the first resource allocation, a fifth random access communication associated with a second network entity; receiving, via the second resource allocation, a sixth random access communication associated with a third network entity; establishing a first connection with the second network entity based on receiving the fifth random access communication; and establishing a second connection with the third network entity based on receiving the sixth random access communication.

Aspect 27: The method of any of Aspects 16-26, wherein the first random access communication and the second random access communication are associated with a same radio resource allocation that is associated with the random access preamble.

Aspect 28: The method of any of Aspects 16-27, wherein the first random access communication and the second random access communication are random access messages.

Aspect 29: The method of any of Aspects 16-28, wherein the third random access communication and the fourth random access communication are random access response communications.

Aspect 30: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-29.

Aspect 31: An apparatus for wireless communication at a device, the apparatus comprising one or more memories and one or more processors coupled to the one or more memories, the one or more processors configured to cause the device to perform the method of one or more of Aspects 1-29.

Aspect 32: An apparatus for wireless communication, the apparatus comprising at least one means for performing the method of one or more of Aspects 1-29.

Aspect 33: A non-transitory computer-readable medium storing code for wireless communication, the code comprising instructions executable by one or more processors to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

Aspect 35: A device for wireless communication, the device comprising a processing system that includes one or more processors and one or more memories coupled with the one or more processors, the processing system configured to cause the device to perform the method of one or more of Aspects 1-29.

Aspect 36: An apparatus for wireless communication at a device, the apparatus comprising one or more memories and one or more processors coupled to the one or more memories, the one or more processors individually or collectively configured to cause the device to perform the method of one or more of Aspects 1-29.

Aspect 37: A device for wireless communication, comprising: a processing system configured to perform the method of one or more of Aspects 1-29.

Aspect 38: An apparatus for wireless communication at a device, the apparatus comprising: a processing system configured to perform the method of one or more of Aspects 1-29.

Aspect 39: A device for wireless communication, comprising: at least one memory; at least one communication interface; and at least one processor coupled to the at least one memory and the at least one communication interface, wherein the at least one processor is configured to perform the method of one or more of Aspects 1-29.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, because those skilled in the art understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. As another example, "determining" can include resolving, selecting, obtaining, choosing, establishing and other such similar actions.

Even though particular combinations of features are recited in the claims and/or disclosed in the specification, these combinations do not limit the scope of the disclosure. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" covers a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein is critical or essential unless explicitly described as such. Also, as used herein, the articles "a" and "an" include one or more items and may be used interchangeably with "one or more." Further, as used herein, the article "the" includes one or more items referenced in connection with the article "the" and may be used interchangeably with "the one or more." Furthermore, as used herein, the terms "set" and "group" include one or more items and may be used interchangeably with "one or more." Where only one item is intended, the phrase "only one" or similar language is used. Also, as used herein, the terms "has," "have," "having," or the like are open-ended terms that do not limit an element that they modify (e.g., an element "having" A may also have B). Further, as used herein, "based on" is in the inclusive sense, unless otherwise explicitly indicated. For example, "based on" may be used interchangeably with "based at least in part on," "associated with", or "in accordance with" unless otherwise explicitly indicated. The phrase "based on" shall not be construed as a reference to a closed set of information, one or more conditions, one or more factors, or the like. Specifically, unless a phrase refers to "based on only 'a,'" or the equivalent in context, whatever it is that is "based on 'a,'" or "based at least in part on 'a,'" may be based on "a"

alone or based on a combination of "a" and one or more other factors, conditions or information. Also, as used herein, the term "or" is inclusive when used in a series and may be used interchangeably with "and/or," unless explicitly stated otherwise (e.g., if used in combination with "either" or "only one of").

What is claimed is:

1. A first network entity for wireless communication, comprising:
a processing system configured to:
transmit, to a second network entity, a first random access communication, wherein the first random access communication includes a random access preamble;
receive, from the second network entity, a second random access communication including an identifier indicative of the random access preamble, wherein the second random access communication indicates a first resource allocation, and wherein the second random access communication is associated with first spatial domain information;
receive, from the second network entity, a third random access communication including the identifier, wherein the third random access communication indicates a second resource allocation, and wherein the third random access communication is associated with second spatial domain information;
determine a particular resource allocation and a particular spatial domain information based on first measurement information associated with the second random access communication and second measurement information associated with the third random access communication; and
transmit, to the second network entity, a fourth random access communication via the particular resource allocation, wherein the particular resource allocation is either the first resource allocation or the second resource allocation, wherein the fourth random access communication is based on the particular spatial domain information, wherein the first measurement information includes a first value and the second measurement information includes a second value, wherein, based on the first value being greater than the second value, the particular resource allocation is the first resource allocation, and wherein, based on the first value being greater than the second value, the particular spatial domain information is based on the first spatial domain information.

2. The first network entity of claim 1, wherein the processing system is configured to monitor, for a period of time after receipt of the second random access communication, for one or more random access communications that include the identifier, and
wherein the processing system is configured to receive the third random access communication based on monitoring for the one or more random access communications.

3. The first network entity of claim 2, wherein, to transmit the fourth random access communication, the processing system is configured to:
transmit, after the period of time, the fourth random access communication.

4. The first network entity of claim 1, wherein, to transmit the fourth random access communication, the processing system is configured to:

transmit, based on receipt of the second random access communication, the fourth random access communication; and monitor for one or more random access communications that include the identifier for a period of time after transmission of the fourth random access communication.

5. The first network entity of claim 4, wherein, to receive the third random access communication, the processing system is configured to:

receive, based on monitoring for the one or more random access communications, the third random access communication after transmission of the fourth random access communication.

6. A first network entity for wireless communication, comprising:

a processing system configured to:

transmit, to a second network entity, a first random access communication, wherein the first random access communication includes a random access preamble;

receive, from the second network entity, a second random access communication including an identifier indicative of the random access preamble, wherein the second random access communication indicates a first resource allocation, and wherein the second random access communication is associated with first spatial domain information;

receive, from the second network entity, a third random access communication including the identifier, wherein the third random access communication indicates a second resource allocation, and wherein the third random access communication is associated with second spatial domain information wherein the second random access communication is associated with first measurement information indicating a first value, wherein the third random access communication is associated with second measurement information indicating a second value; and transmit, to the second network entity, a fourth random access communication via a particular resource allocation, wherein the particular resource allocation is either the first resource allocation or the second resource allocation, wherein the fourth random access communication is based on particular spatial domain information, and wherein the particular spatial domain information is based on either the first spatial domain information or the second spatial domain information;

transmit, to the second network entity and based on the second value being greater than the first value, a fifth random access message, wherein the fifth random access message uses the second resource allocation based on the second value being greater than the first value, and wherein the fifth random access message uses spatial domain information that is based on the second spatial domain information based on the second value being greater than the first value.

7. A first network entity for wireless communication, comprising:

a processing system configured to:

receive a first random access communication, wherein the first random access communication includes a random access preamble, and wherein the first random access communication is associated with first spatial domain information;

receive a second random access communication, wherein the second random access communication includes the random access preamble, and wherein the second random access communication is associated with second spatial domain information;

transmit, based on the first random access communication being associated with the first spatial domain information, a third random access communication indicating an identifier of the random access preamble and a first resource allocation for an uplink random access communication;

transmit, based on the second random access communication being associated with the second spatial domain information, a fourth random access communication indicating the identifier and a second resource allocation for the uplink random access communication; and determine that the third random access communication and the fourth random access communication are to be transmitted based on a difference between the first spatial domain information and the second spatial domain information.

8. The first network entity of claim 7, wherein, to transmit the third random access communication, the processing system is configured to:

transmit the third random access communication using spatial domain information that is based on the first spatial domain information.

9. The first network entity of claim 8, wherein the first spatial domain information indicates a receive beam used to receive the first random access communication, and wherein the spatial domain information indicates a transmit beam corresponding to the receive beam.

10. The first network entity of claim 8, wherein the spatial domain information indicates a precoder that is based on a channel estimate of a channel associated with the first random access communication and the first spatial domain information.

11. The first network entity of claim 7, wherein, to transmit the fourth random access communication, the processing system is configured to:

transmit the fourth random access communication using spatial domain information that is based on the second spatial domain information.

12. The first network entity of claim 11, wherein the second spatial domain information indicates a receive beam used to receive the second random access communication, and wherein the spatial domain information indicates a transmit beam corresponding to the receive beam.

13. The first network entity of claim 11, wherein the spatial domain information indicates a precoder that is based on a channel estimate of a channel associated with the second random access communication and the second spatial domain information.

14. The first network entity of claim 7, wherein the first spatial domain information indicates a first spatial domain direction, wherein the second spatial domain information indicates a second spatial domain direction, and wherein the difference is an angle between the first spatial domain direction and the second spatial domain direction, and wherein the processing system is configured to determine that the third random access communication and the fourth random access communication are to be transmitted based on the angle satisfying a threshold.

15. The first network entity of claim 7, wherein the first random access communication and the second random access communication are associated with a same radio resource allocation that is associated with the random access preamble.

16. A first network entity for wireless communication, comprising:

a processing system configured to:

receive a first random access communication, wherein the first random access communication includes a random access preamble, and wherein the first random access communication is associated with first spatial domain information;

receive a second random access communication, wherein the second random access communication includes the random access preamble, and wherein the second random access communication is associated with second spatial domain information;

transmit, based on the first random access communication being associated with the first spatial domain information, a third random access communication indicating an identifier of the random access preamble and a first resource allocation for an uplink random access communication;

transmit, based on the second random access communication being associated with the second spatial domain information, a fourth random access communication indicating the identifier and a second resource allocation for the uplink random access communication;

detect a first path associated with the first random access communication and a second path associated with the second random access communication;

estimate a first channel estimate for the first path across one or more antennas of the first network entity; and estimate a second channel estimate for the second path across the one or more antennas, wherein the third random access communication is associated with a first precoder that is based on the first channel estimate and the fourth random access communication is associated with a second precoder that is based on the second channel estimate.

17. A first network entity for wireless communication, comprising:

a processing system configured to:

receive a first random access communication, wherein the first random access communication includes a random access preamble, and wherein the first random access communication is associated with first spatial domain information;

receive a second random access communication, wherein the second random access communication includes the random access preamble, and wherein the second random access communication is associated with second spatial domain information;

transmit, based on the first random access communication being associated with the first spatial domain information, a third random access communication indicating an identifier of the random access preamble and a first resource allocation for an uplink random access communication;

transmit, based on the second random access communication being associated with the second spatial domain information, a fourth random access communication indicating the identifier and a second resource allocation for the uplink random access communication;

receive, via the first resource allocation, a fifth random access communication associated with a second network entity;

receive, via the second resource allocation, a sixth random access communication associated with a third network entity;

establish a first connection with the second network entity based on the fifth random access communication; and establish a second connection with the third network entity based on the sixth random access communication.

* * * * *